Sept. 22, 1936.　　　G. O. GRIDLEY ET AL　　　2,055,435
METALWORKING MACHINE
Filed July 16, 1931　　18 Sheets-Sheet 1

INVENTORS,
G. O. Gridley
D. H. Montgomery
BY E. H. Whipple
Mitchell Bechert
ATTORNEYS Sept. 22, 1936.   G. O. GRIDLEY ET AL   2,055,435
METALWORKING MACHINE
Filed July 16, 1931   18 Sheets-Sheet 10

INVENTORS
E. O. Gridley
J. H. Montgomery
L. H. Wheeler
BY
Mitchner Bechert
ATTORNEYS

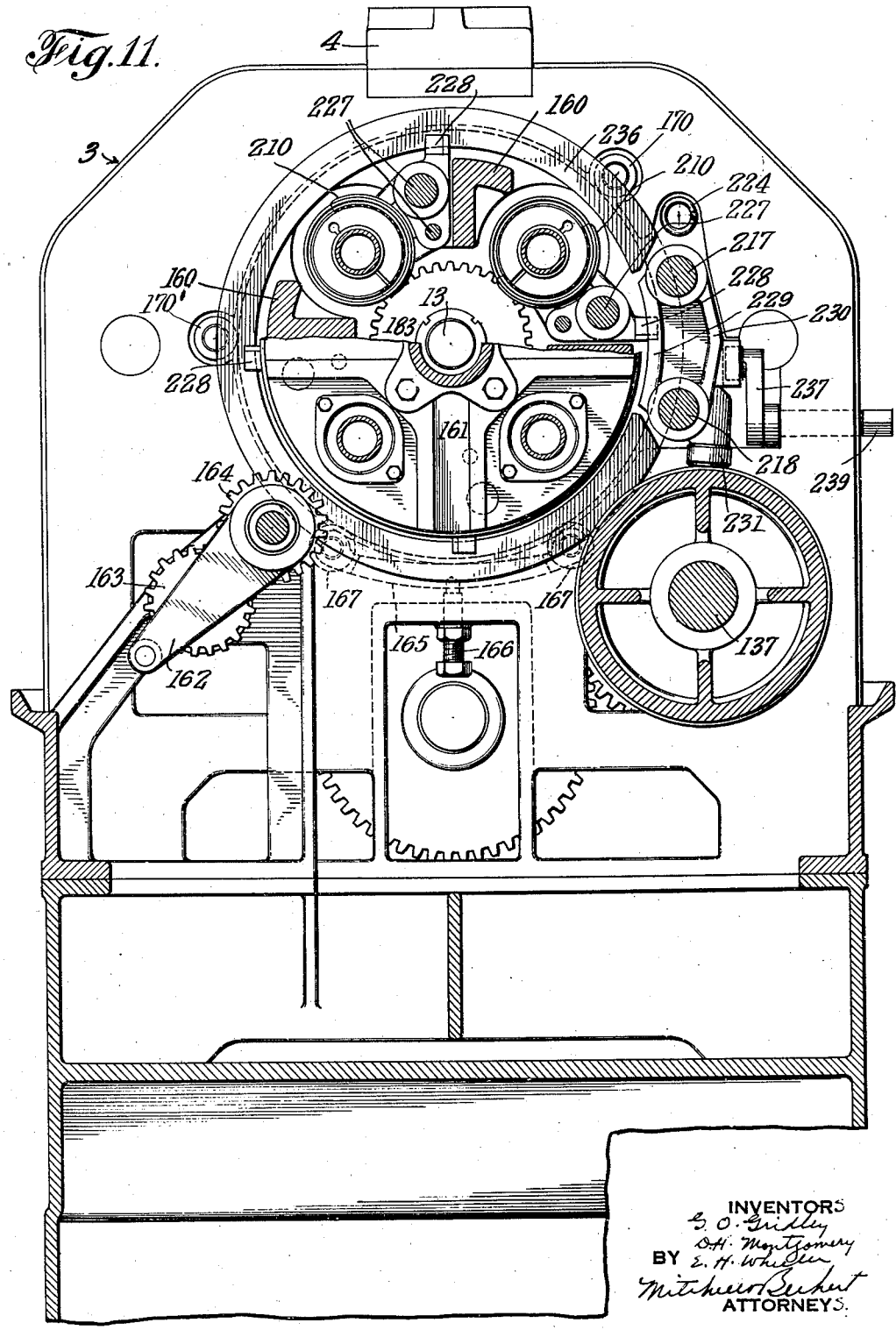

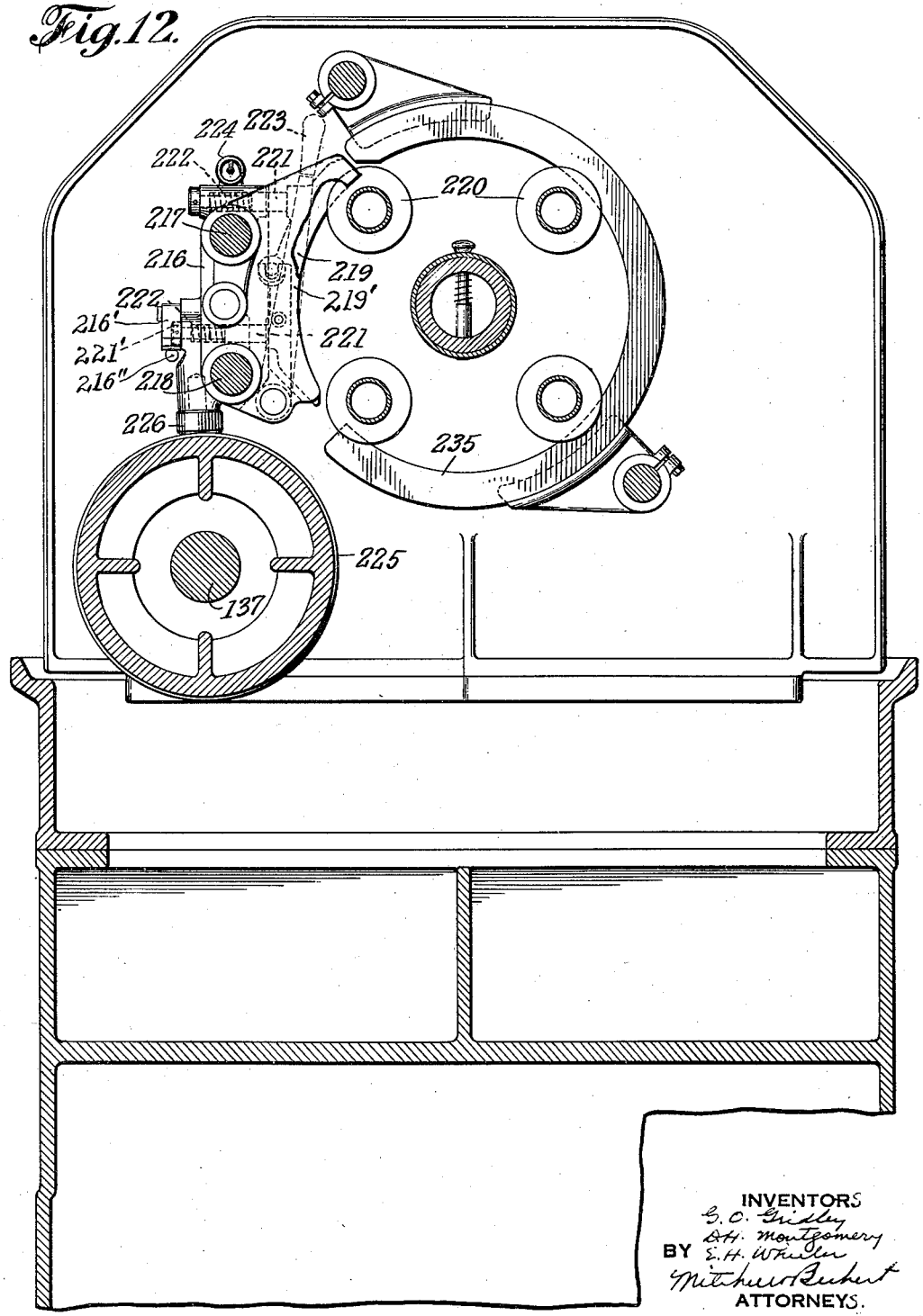

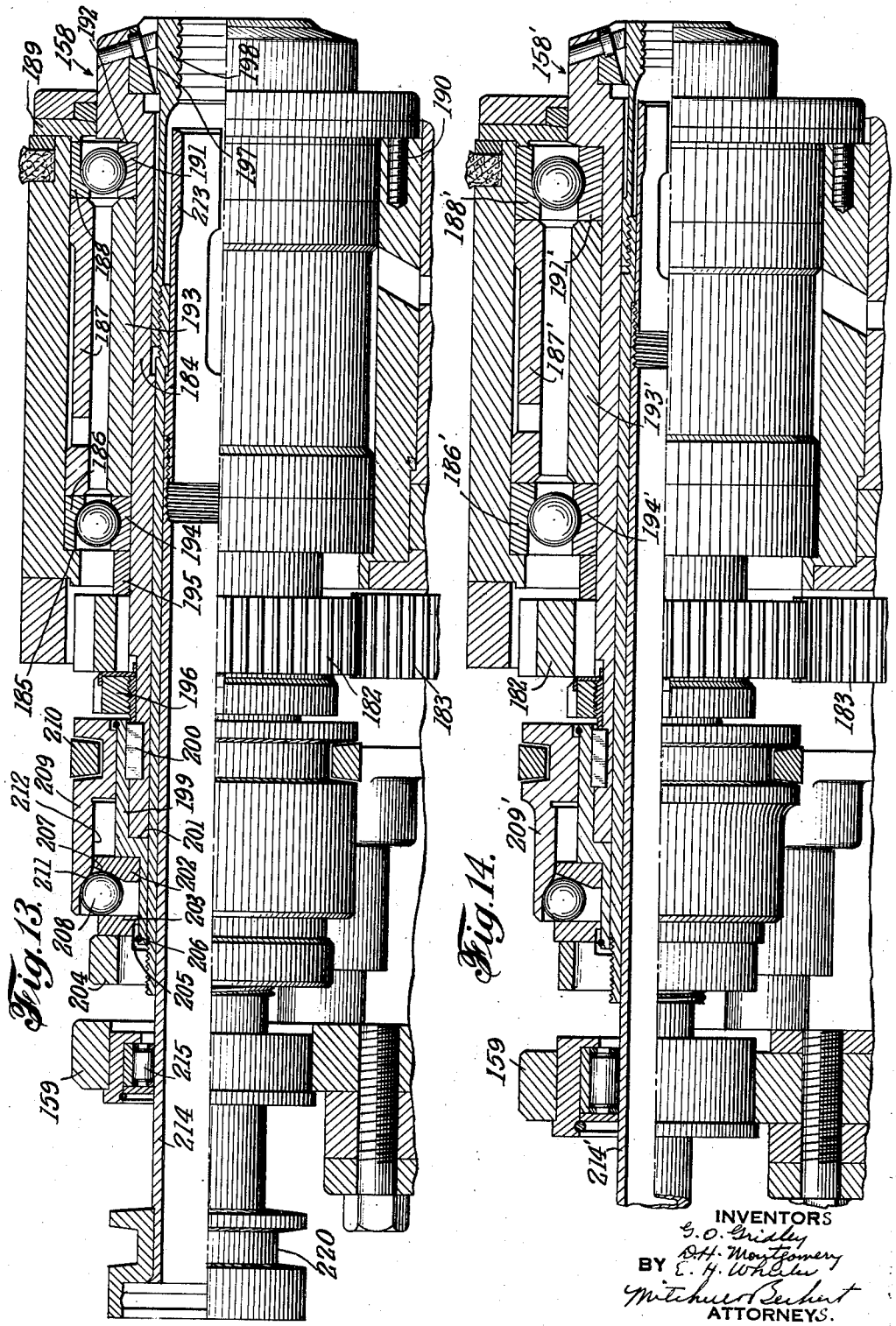

Sept. 22, 1936.  G. O. GRIDLEY ET AL  2,055,435
METALWORKING MACHINE
Filed July 16, 1931  18 Sheets-Sheet 14
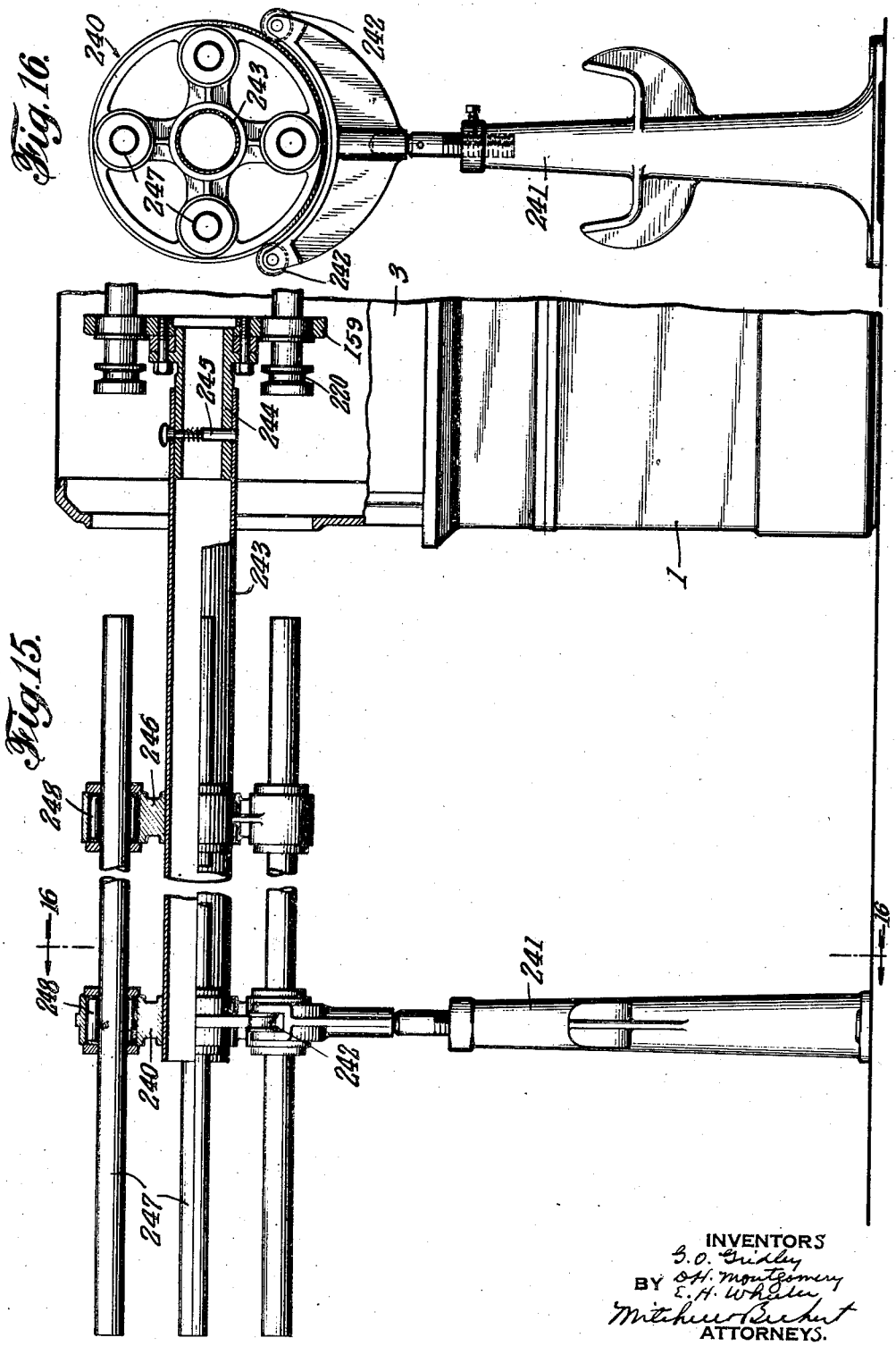
INVENTORS
G. O. Gridley
O. H. Montgomery
BY E. H. Wheeler
Mitchell Bechert
ATTORNEYS.

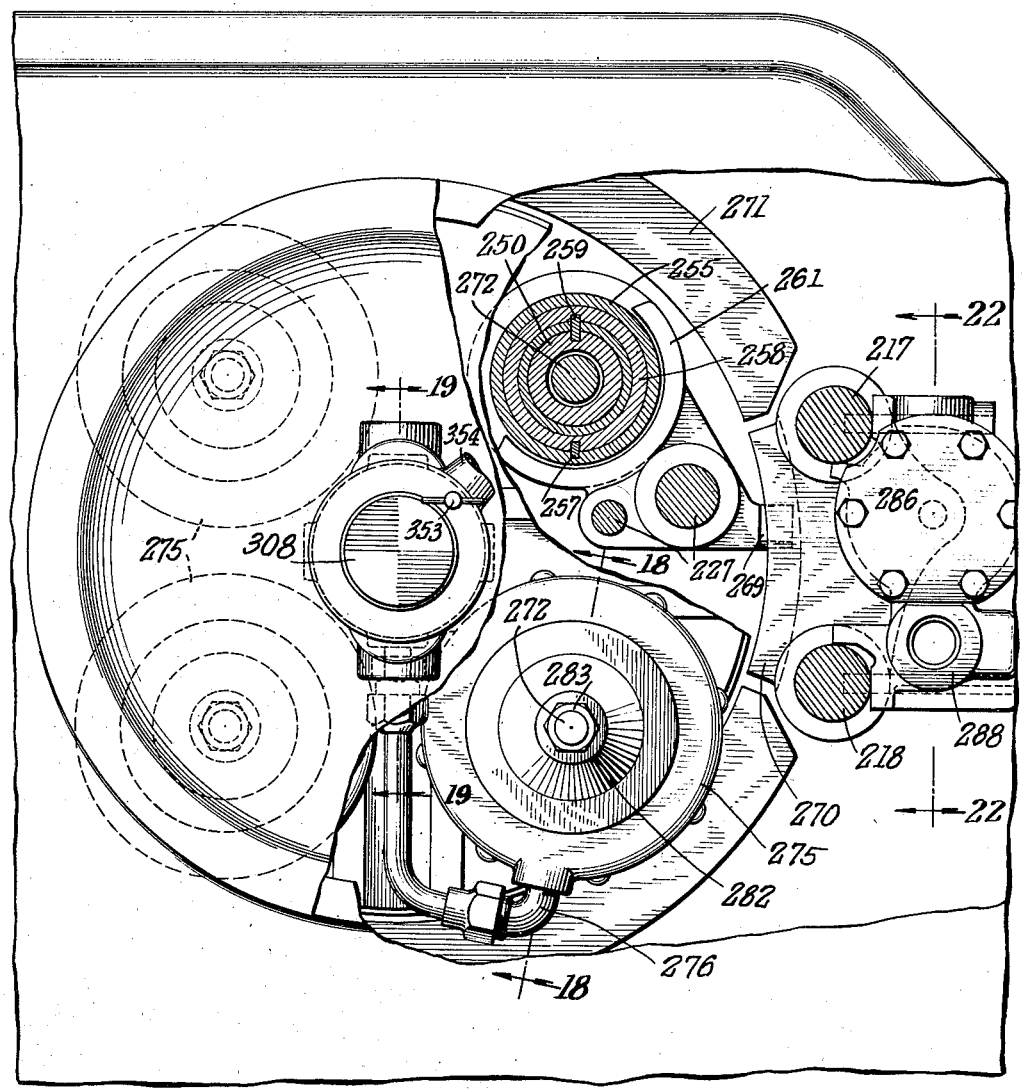

Sept. 22, 1936. G. O. GRIDLEY ET AL 2,055,435
METALWORKING MACHINE
Filed July 16, 1931 18 Sheets-Sheet 16
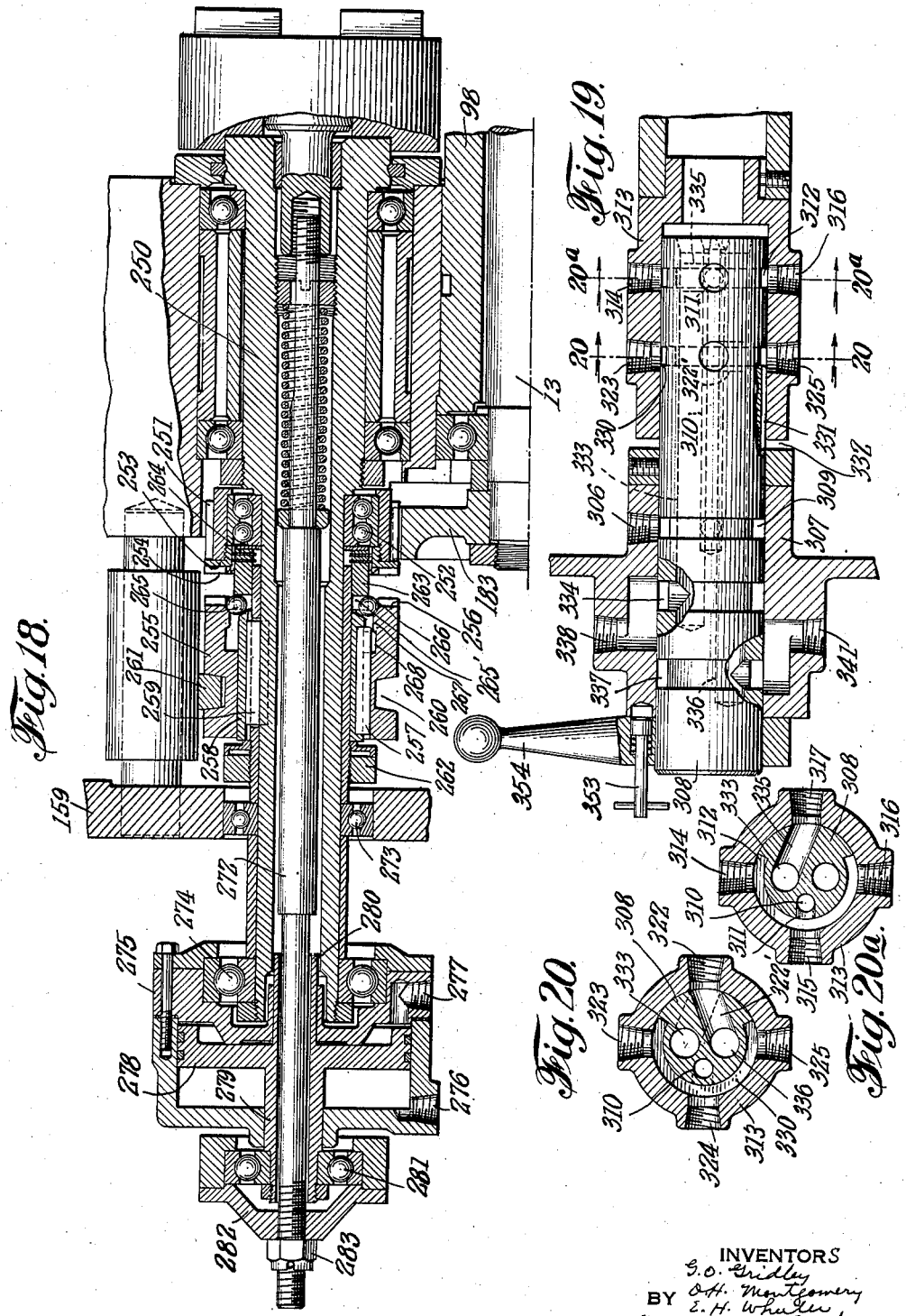

Sept. 22, 1936.  G. O. GRIDLEY ET AL  2,055,435
METALWORKING MACHINE
Filed July 16, 1931   18 Sheets-Sheet 17

INVENTORS
G. O. Gridley
D. H. Montgomery
BY E. H. Whyler
ATTORNEYS.

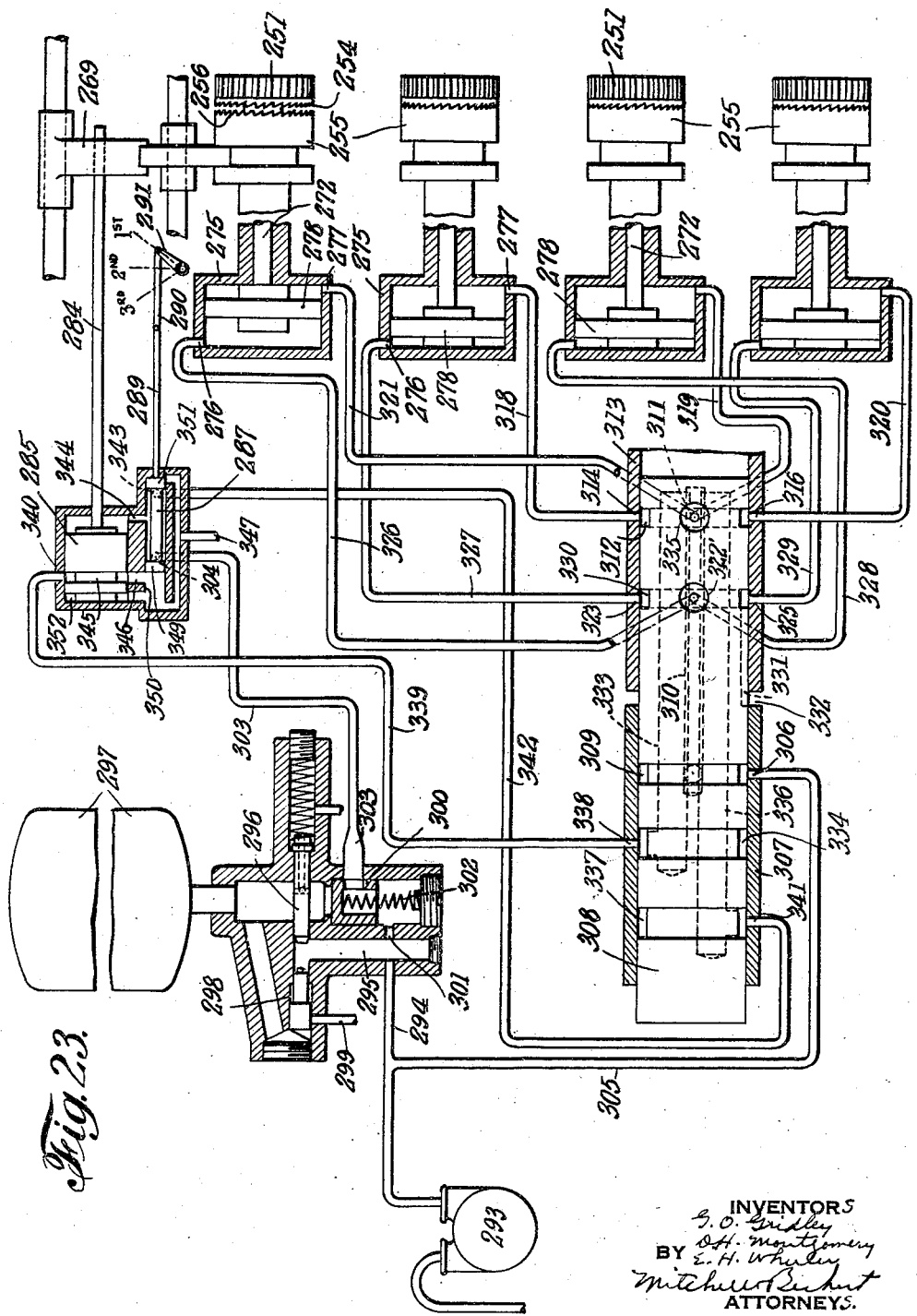

Patented Sept. 22, 1936

2,055,435

UNITED STATES PATENT OFFICE 2,055,435

METALWORKING MACHINE

George O. Gridley and Donald H. Montgomery, Berlin, and Earl H. Wheeler, Hartford, Conn., assignors, by mesne assignments, to The New Britain Machine Company, New Britain, Conn., a corporation of Connecticut Application July 16, 1931, Serial No. 551,136

96 Claims. (Cl. 29—37)

The invention relates to a metal working machine and will be described as embodied in a multiple spindle screw machine and chucking machine.

It is to be observed, however, that various features of the invention are of broader application and may be advantageously embodied in machines of other types.

It is a general object of the invention to provide a machine of the character indicated, having many improved structural and functional features, producing a machine which is exceedingly flexible, of sturdy and compact construction, and capable of turning out work of great accuracy at an exceedingly high rate of speed.

It is a more specific object to provide an improved cross slide arrangement, simple to manufacture, very sturdy and accurate in action.

Another object is to provide an improved tool slide guiding means.

It is a further object to provide a machine of the character indicated, wherein rotating tools may be located opposite any or all of the spindles of an indexable carrier.

Another object is to provide a machine of the character indicated with exceedingly short spindles compared with those heretofore in use and which are capable of working at exceedingly high speeds without undue wear or impairment of accuracy.

It is another object to provide improved work chucking means, simple in construction and operation, and readily adjustable to compensate for wear.

Another object is to provide a spindle carrier with spindle bores to interchangeably receive large diameter spindles supported on small anti-friction bearings, and smaller diameter spindles supported on larger anti-friction bearings.

Another object is to provide a bar machine with a stock reel positively indexable with the spindle carrier.

It is still another object to provide an improved spindle driving means whereby the spindle rotation may be initiated by a friction clutch and positively driven by a positive clutch.

Another object is to provide a machine of the character indicated with rotating spindles in which fluid pressure chucking devices and fluid pressure actuated clutching devices may be readily and simply operated and controlled.

It is another object to provide improved fluid pressure chucking devices and manual control means for rendering it possible to actuate any chuck in a group of chucks at will.

Several other objects and various features of invention will be hereinafter pointed out or will become apparent.

As stated, the invention will be described as embodied in a so-called multiple spindle screw machine and a chucking machine.

In a preferred form and speaking generally, the machine comprises a frame or base supporting a power case for driving mechanism and opposite thereto a spindle carrier case or head for supporting the spindle carrier and various associated mechanisms. A top plate or tie bar serves to connect the spindle carrier end of the frame to the power case end thereof. The machine generally is symmetrically designed about a single axis, which is the axis of the spindle drive shaft.

Forming or cross tool slides are preferably located symmetrically relatively to the spindle carrier, so that work carried by each spindle may be simultaneously operated on by forming tools. End working tools, either rotatable or non-rotatable, may also act on work carried by each spindle in each position. The machine is arranged for rotating end working tools located opposite any or every station of the spindle carrier, which tools may with great facility be rotated in either direction.

The pump arrangement is such that cutting fluid at low pressure may be copiously supplied where needed, and cutting fluid under high pressure may be supplied for such operations as deep hole drilling requiring such high pressure.

The machine may be arranged for continuous automatic operation or may be manually set, so as to knock off after each index. The spindles, which are readily interchangeable so as to convert the machine from one size to another, are arranged for exceedingly high speed rotation without undue wear and improved chucking means have been provided.

The stock reel for the bar machine may be positively indexed with the spindle carrier, thus removing all indexing strain from the bars of stock so as to prevent wind up and whipping of the stock reel due to the high rate of speed of index.

The bar machine as modified to constitute a chucking machine preferably embodies fluid pressure actuated chucking means and fluid pressure actuated spindle clutch means, which are so correlated as to facilitate the high speed production of accurate work. The hydraulic chucking mechanism is so arranged that when necessary any chuck in a group of chucks may be opened.

The various features just generally mentioned and others of importance will be described more in detail hereinafter.

In the drawings which show, for illustrative purposes only, preferred forms of the invention—

Fig. 4a is a fragmentary side view in partial section of a work stop and views taken substantially in the planes of the lines a—a and b—b in the directions of the arrows;

Fig. 11 is a sectional view taken substantially in the plane of the line 11—11 of Fig. 9;

Fig. 12 is a sectional view taken substantially in the plane of the line 12—12 of Fig. 9;

Fig. 13 is an enlarged detail view in partial section of a spindle and associated parts illustrating features of the invention;

Fig. 14 is a view similar to Fig. 13, but showing a spindle of smaller size but with larger bearings;

Fig. 15 is a fragmentary view of the spindle carrier end of the machine and illustrating a stock reel positively indexable with the spindle carrier;

Fig. 16 is a sectional view taken substantially in the plane of the line 16—16 of Fig. 15;

Fig. 17 is an end view in partial section, parts being broken away, of the spindle carrier end of the machine embodied as a chucking machine;

Fig. 18 is a sectional view taken substantially in the plane of the line 18—18 of Fig. 17;

Fig. 19 is a view taken substantially in the plane of the line 19—19 of Fig. 17;

Fig. 20 is a sectional view taken substantially in the plane of the line 20—20 of Fig. 19.

Fig. 20a is a view similar to Fig. 20 but taken substantially in the plane of the line 20a—20a of Fig. 19;

Fig. 23 is a diagrammatic view of a fluid pressure actuated chucking and clutching mechanism for a chucking machine.

The machine as embodying a screw machine will first be described, and thereafter the modifications necessary for converting to a chucking machine will be set forth.

Figure 1:
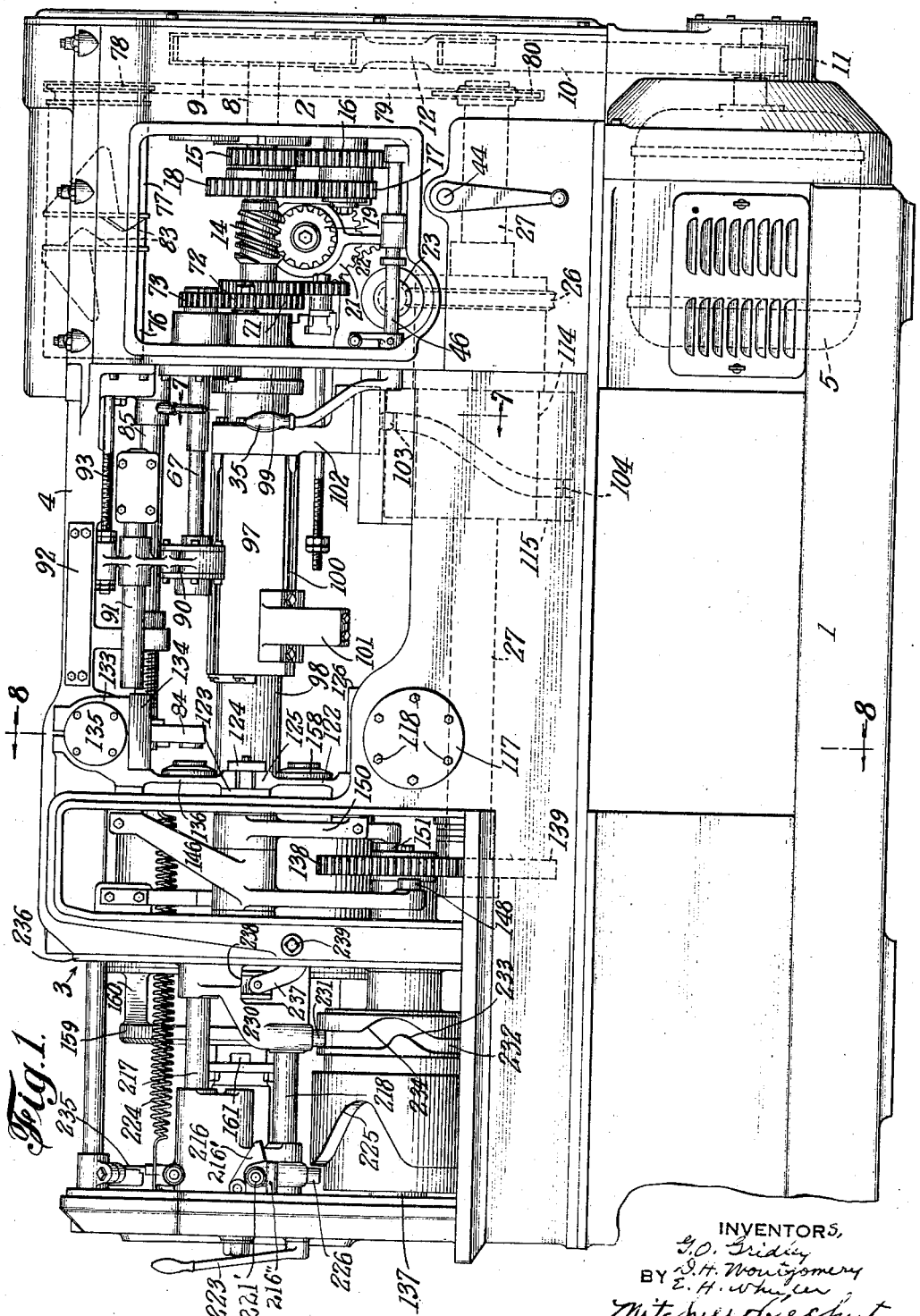
Fig. 1 is a front view in elevation of a screw machine embodying features of the invention, some of the cover plates being removed to expose interior construction.

Referring to Fig. 1, the machine comprises a base 1 having a power case or drive mechanism support 2 and a spindle carrier head designated generally 3. The power case and spindle carrier head are connected by a top plate or tie bar 4, to provide a machine frame of great rigidity and also to serve when necessary as a tool slide guide or support for auxiliary slides or attachments. The spindle carrier has a plurality of rotatable work spindles, which are driven from a shaft extending from the power case. The feed works are also driven from the power case, preferably at different speeds during each cycle of the machine.

The power case end

Power may be supplied to the machine as from an electric motor 5 (Figs. 1 and 2) supported within the base 1. The power case is provided with a high speed shaft 6, carrying a sprocket 7, and is also provided with a spindle drive shaft and slow speed cam drive shaft 8, carrying a sprocket 9. A chain 10 connects the sprockets 7 and 9 and the drive sprocket 11 on the motor shaft. The spindle drive shaft 8, as will be later described, is also employed for the slow speed cam drive. A suitable spring pressed or other type of chain tightener 12 is employed for maintaining the chain taut.

The drive shaft 8 passes into the power case and carries a pinion 15, meshing with a back gear 16, which has non-rotatably secured thereto a second back gear 17, meshing with a gear 18 directly driving the spindle drive shaft 13 (Fig. 4) and worm 14. The spindle drive shaft 13 extends to the spindle carrier and drives the spindles, as will be later described. The sprocket 9 on the shaft 8 is readily removable, so that a sprocket of different size may be employed to secure any desirable spindle speed. It is also possible to remove the back gears 16, 17, and key the gears 15, 18, together so as to secure a direct drive for the spindle drive shaft 13.

The slow speed cam drive is from the worm 14, carried by the main spindle drive shaft 13. As illustrated particularly in Figs. 1 and 4, the worm 14 meshes with a worm gear 19 on a suitable supported shaft 20, carrying at its outer end a change gear 21. The change gear 21 meshes with a second change gear 22, and finally drives the cam drive worm 23. For a purpose to be later described an overrunning clutch or other ratchet mechanism 24 is interposed between the drive gear 22 and the worm 23. A clutch 25 permits the worm 23 to be clutched and unclutched from the shaft carrying the gear 22. Obviously, by means of the change gears 21, 22, any desirable slow speed may be imparted to the worm 23, and consequently to the worm gear 26, which drives the main cam shaft 27. The worm gear 26 is preferably frictionally secured to the cam drive shaft 27, so that, in case of abnormal resistance to the rotation of the cam shaft 27, the worm gear 26 will slip and give time for the thermal overload or other safety device on the motor to act, and will avoid serious damage to the other parts of the machine.

Figure 2:
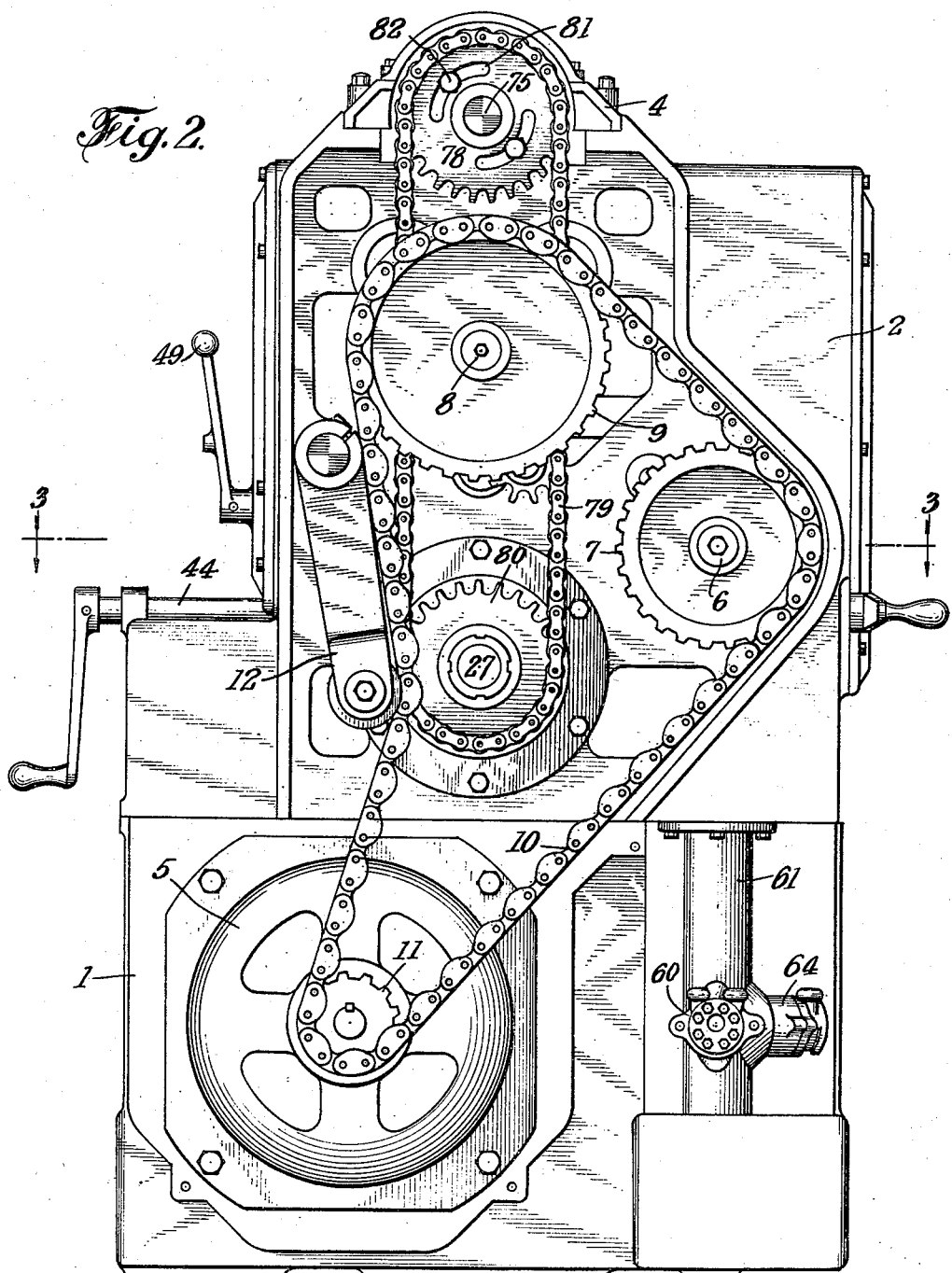
Fig. 2 is an end view in elevation of the power case or driving end of the machine disclosed in Fig. 2, a cover plate being removed.
Figure 3:
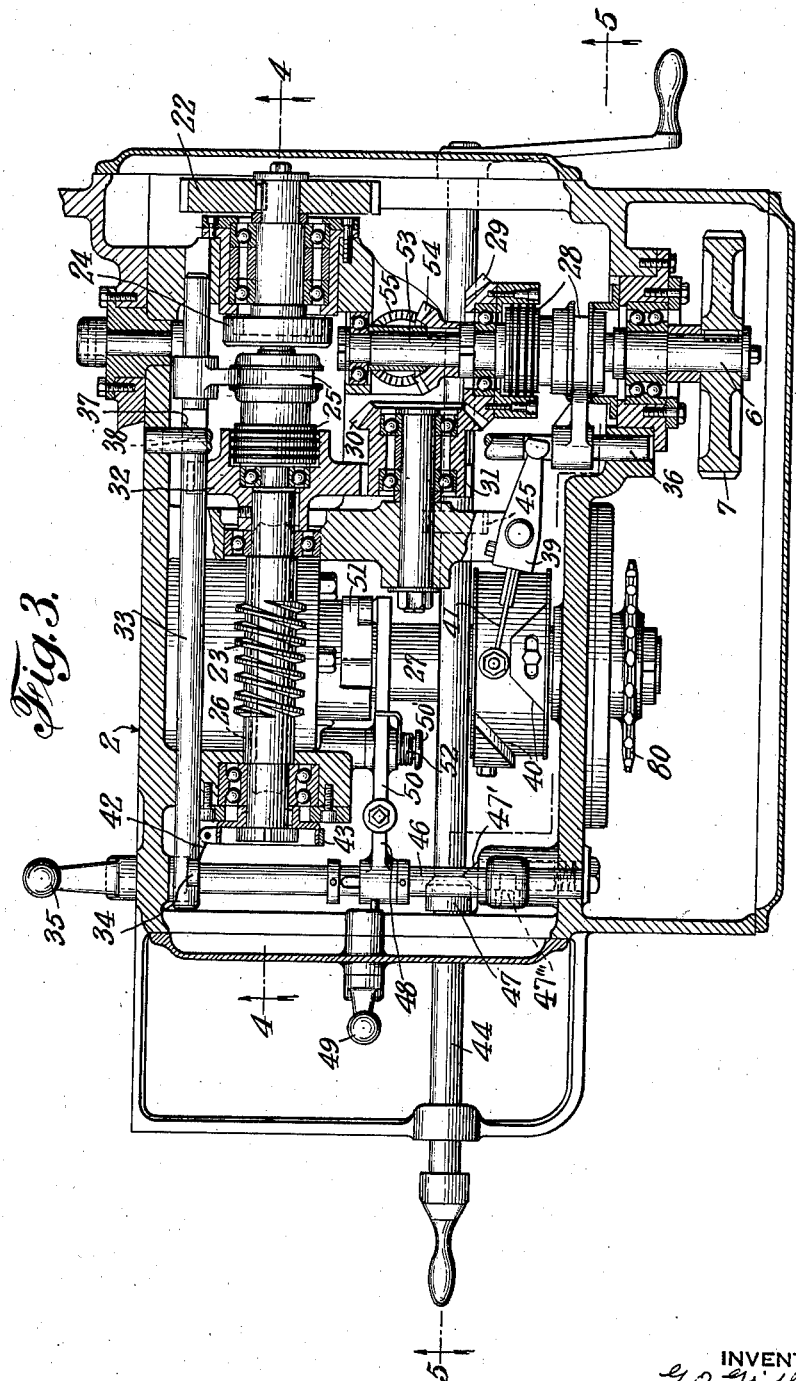
Fig. 3 is a sectional view taken substantially in the plane of the line 3—3 of Fig. 2.

The high speed drive for the main cam shaft 27 starts from the chain sprocket 7 and shaft 6 (Figs. 2 and 3). By proper selection of size for the sprocket 7, any desirable speed for the high speed drive may be obtained. The shaft 6, acting through a clutch 28, carried in part by a bevel gear 29, drives the latter, which in turn drives the bevel gear 30. That bevel gear may have integral therewith or secured thereto a spur gear 31, meshing with a spur gear 32, which in turn constitutes part of the slow speed clutch 25 heretofore mentioned. The gear 32 is keyed to the shaft of the worm gear 23, and so long as the clutch 28 is in, drives the worm gear 23 at high speed.

When both the clutch 28 and the clutch 25 are engaged, the worm 23 is driven at high speed, the overrunning clutch 24 heretofore mentioned permitting the shaft of worm 23 to rotate at the high speed, even though the slow speed drive mechanism is operating. The high speed clutch 28 is normally automatically controllable and the slow speed clutch 25 is normally manually controllable, and the manual control of the clutch 25, through means to be described, likewise controls the clutch 28 in one direction. The slow speed clutch 25 is shiftable by a clutch rod 33, connected through an arm 34 on shaft 46 to a manual start and stop handle 35 on the outside of the machine. When the handle 35 is shifted to move the rod 33 to the right as viewed in Fig. 3, the clutch 25 is thrown out.

The clutch 28 is controlled by a clutch rod 36, which crosses the clutch rod 33, and the latter is provided with a slabbed-off portion and a cam portion 37, which acts against a cam part 38 on the rod 36, so that each time the slow speed clutch 25 is thrown out, the high speed clutch 28 is likewise thrown out, but since the cam arrangement 37—38 preferably acts in only one direction, the slow speed clutch may be thrown in without throwing in the high speed clutch 28.

The high speed clutch 28 is automatically actuated by means of a cam lever 39, engaging a notch in the rod 36 and having a roller engageable with cam members 40 on a drum carried by the main cam shaft 27. The cam lever is so arranged preferably by interposing a spring arm 41 in the length thereof as to permit the clutch shift rod 36 to be moved (by cam parts 37, 38) to throw the clutch out, even though the roller be engaged with a high spot of the cam opposite to the one with which it is now engaged, as shown in Fig. 3. It will thus appear that when the slow speed clutch 25 is thrown out, the high speed clutch will be locked out, but when the slow speed clutch 25 is thrown in, the high speed clutch may be thrown both in and out by cams 40. Another advantage of the spring arm 41 is that the machine may be cranked by hand and the cam 40 may pass the cam roll on arm 41 even though both clutches 25 and 28 be locked in open position, as will be described. When the slow speed clutch 25 is thrown out by the manual handle 35, the arm 34 carrying a projecting arm 42 serves to actuate a brake arrangement 43 for assisting in stopping rotation of the worm 23.

When it is desired to actuate the feed cam manually, as when setting up, the hand feed shaft 44 is moved toward the right as viewed in Fig. 3, to cause the gear 45 to mesh with the gear 31, so that, upon rotation of the shaft 44 by either the handle at the front or rear of the machine, the feed cam may be rotated, as heretofore described. The shaft 44 crosses the shaft 46, which is shiftable manually by the handle 35, and where they cross the shaft 44 is provided with a camming out abutment 47 which depresses a spring pressed detent 47' (Figs. 3 and 5) when the shaft 46 is in such position that the clutch 25 is thrown out. The detent 47' and its housing are provided with notches 47" into which may fit an arm 47''' when the detent is not depressed. When the arm 47''' is in the notch 47" in the detent the latter is held thereby against depression, and the abutment 47 because of engagement with the detent prevents the crank shaft 44 from being moved in to engage the gears 45, 31. The arm 47''' is in the notch 47" when the shaft 46 is rocked so as to throw in the clutch 25. Hand cranking is then impossible. When the shaft 46 is rocked to throw the clutch 25 out, the lever 47''' is retracted from the detent notch 47" and the abutment 47 may then depress the abutment 47' and the gears 45, 31 may be engaged. Under these conditions, the shaft 46 cannot be rocked to throw the clutch in because the arm 47''', coming into engagement with the unnotched part of the detent 47', prevents such rocking of the shaft 46. Hand cranking mechanism and power feed mechanism can therefore never be operative at the same time.

As has been stated, when normal continuous operation of the machine is desired, the clutch 25 is thrown in and the machine then continues to operate until the clutch 25 is again thrown out. Now when it is desired to stop the machine automatically at the end of an indexing operation, for example when it is observed that the stock in one of the spindles is about to run out, we provide means which may be termed a semi-automatic stop to cause the machine to be stopped with the chuck in loading position open. Such means may take the form of an arm 48 (Figs. 3 and 5), splined to the shaft 46 and shiftable endwise thereon by means of a handle 49, as will be clear from the drawings. The arm 48 when in one position, that is, the position shown in Fig. 3, lies in the path of a cam lever 50, pivoted at 50' and engageable with a cam 51 on the cam shaft 27. A spring 52 serves to urge the lever in a clockwise direction as viewed in Fig. 5. Thus, with the arm 48 in the path of the cam lever 50, the arm 48 and shaft 46 will be rotated to throw out the clutch 25 when the cam 51 raises the end of the lever 50. In order to again start the machine the handle 49 is shifted so as to slide the arm 48 out from the path of the lever 50, so that, during normal operation, the lever 50 merely acts at each revolution of the cam shaft 27, but the clutch 25 is not thrown out thereby.

Figure 6:
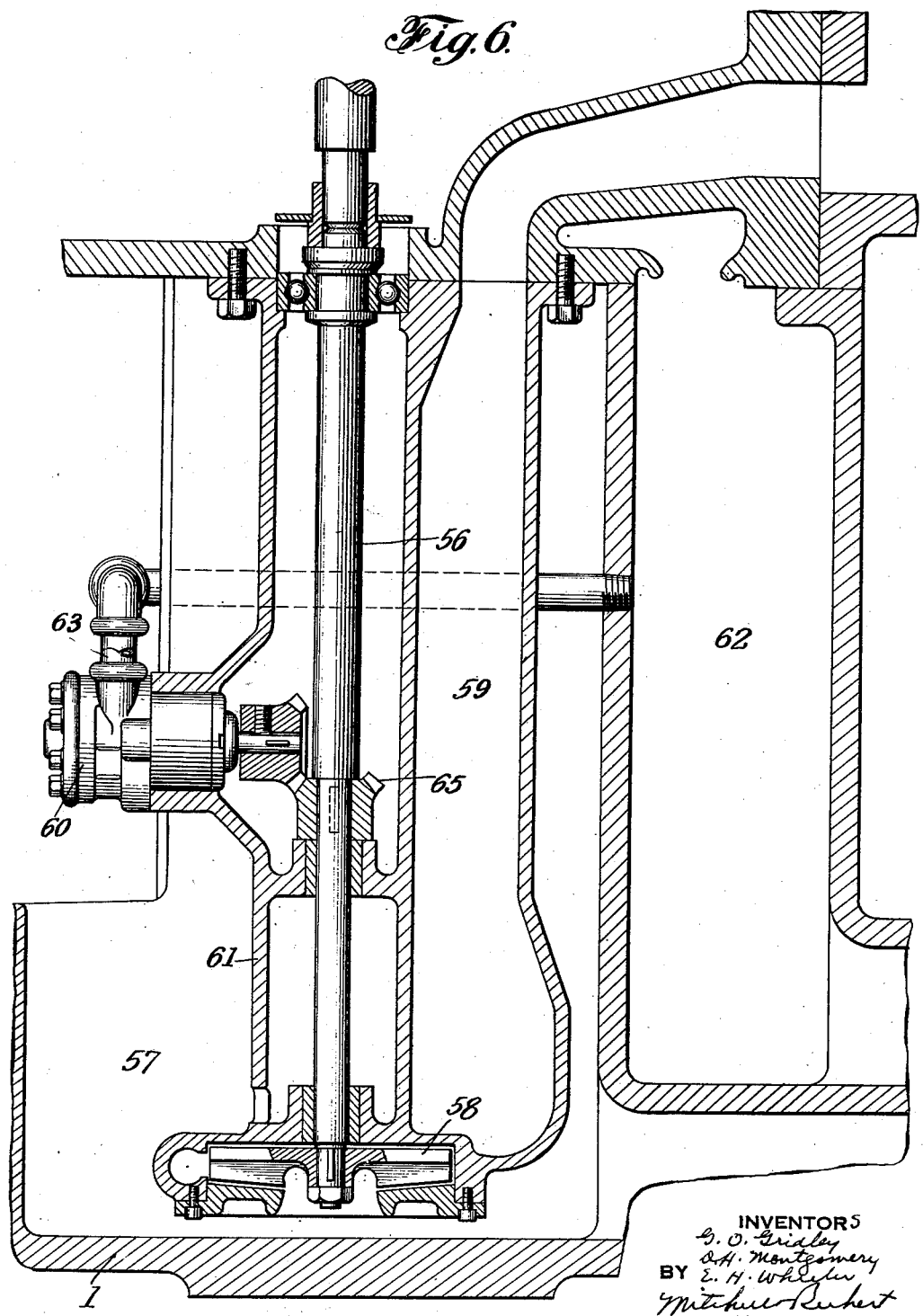
Fig. 6 is a sectional view through a part of the frame and illustrating two of the pumps employed in the machine.

One of the shafts, preferably the shaft 53, driven directly by the sprocket shaft 6, serves to drive the coolant to lubricating pumps. In the form shown the shaft 53 carries a bevel gear 54, meshing with a bevel gear 55, carried by the pump shaft 56 or an extension thereof (Fig. 6). This pump shaft may be divided and splined together, as will be understood, to facilitate assembly and disassembly. The base 1 is provided with a cutting fluid reservoir 57, and communicating with this reservoir is the inlet side of a centrifugal pump 58, discharging into a cored conduit 59 in the base or frame, which cored conduit conducts cutting oil at a comparatively low pressure to tools and work, as will be understood. A second and preferably positive type of pump 60 is supported from the pump casing 61 and draws lubricating oil from a lubricating oil reservoir 62 in the base or frame. The discharge pipe 63 from the pump 60 conducts lubricating oil to such points where it may be required. As shown more particularly in Fig. 2, a third pump 64 is supported from the pump casing 61, which pump 64 is preferably a positive type of pump and serves to supply cutting fluid at high pressure when required, for example, in deep hole drilling. The pump 64 may take its supply from the discharge side of the centrifugal pump 58 and to that extent act as a booster pump therefor in supplying high pressure cutting oil. Both the pumps 60 and 64 may be driven through bevel gears from a common bevel gear 65 on the pump shaft 56.

The cored passages 59 in the frame, in addition to acting as conduits for cutting oil or lubricating oil or both, serve to lighten the frame and act as strengthening webs or ribs to render the same more rigid. The use of the passages also eliminates much of the piping which would otherwise be necessary.

Figure 4:
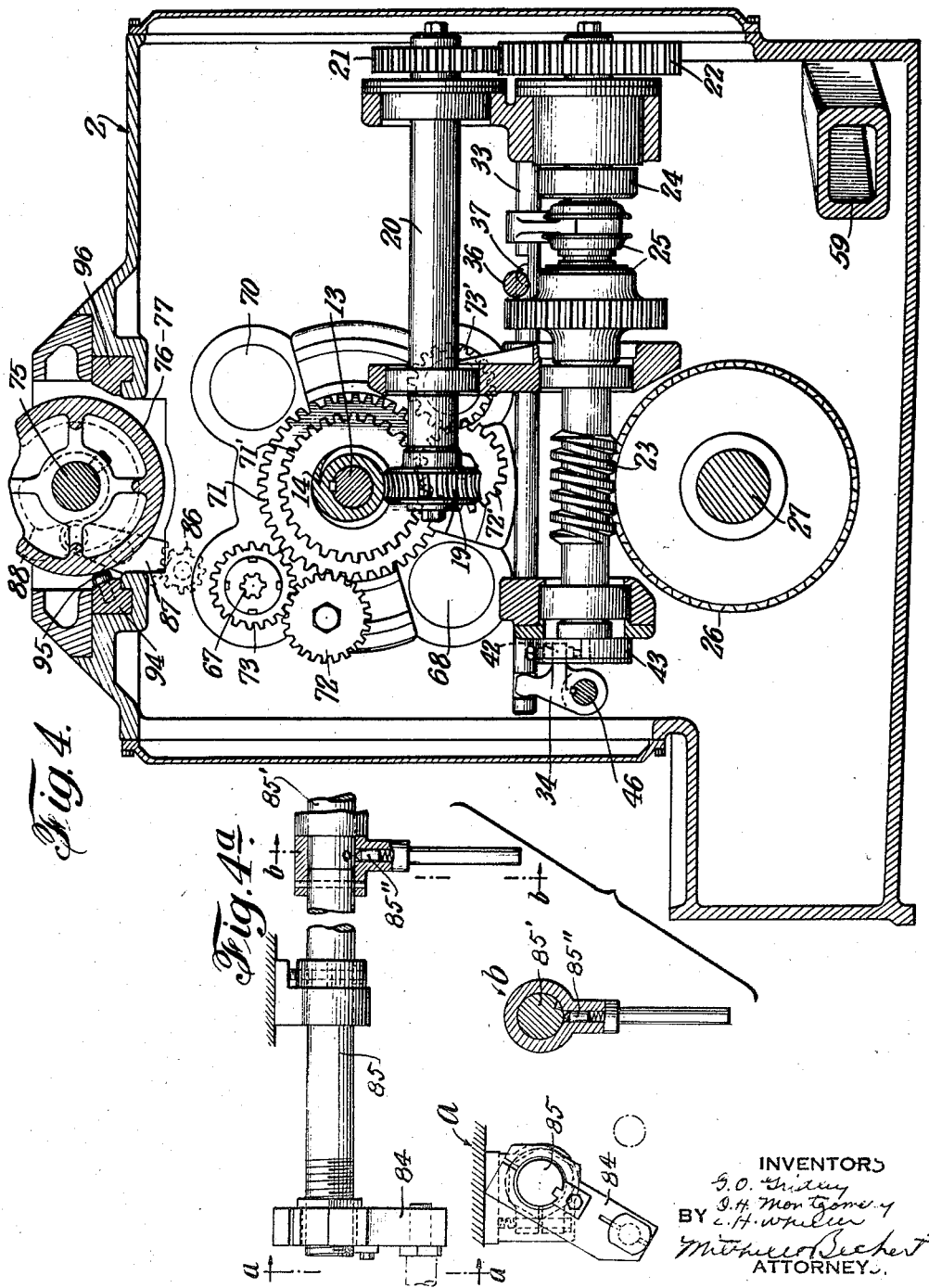
Fig. 4 is a sectional view taken substantially in the plane of the line 4—4 of Fig. 3.

Aside from the mechanisms and devices heretofore described, other mechanisms are driven from the power case. Such other mechanisms include an auxiliary cam shaft normally useful for feeding accelerated tools and accelerated or other rotatable tool spindles. As heretofore suggested, the machine is symmetrically designed about the spindle drive shaft. In the power case end of the machine there are a plurality of tool positions corresponding to the number of spindles, in the present instance four. Two rotatable tool spindles 67, 69 (Fig. 5) are shown in two of such positions. The other positions are indicated at 68 and 70. Rotatable spindles, either for threading or other purposes, may be supported in any of the four tool positions, or, in fact, in all of the four tool positions shown. With the particular arrangement illustrated, the spindle 67 is driven at a comparatively high speed and in a direction opposite to the work spindle rotation. The main spindle drive shaft 13 carries within the power case a gear 71, which may mesh directly with a gear carried by any tool spindle (for example, threading spindle) in any of the four positions illustrated, so as to provide a tool spindle rotation in the same direction as the rotation of the work spindle. However, as illustrated, an idler gear 72 is interposed between the drive gear 71 and the pinion 73, carried by the tool spindle shaft 67. The frame of the machine is arranged so that the idler gear 72 may be located as shown or moved downwardly so as to coact with the gear (not shown) on a tool spindle in the lower position 68. An idler gear may also be interposed between the drive gear 71 and gears on shafts in either of the positions 69 or 70, for example, gears 72', 73' (Fig. 4). The frame for that purpose may be provided with any suitable ways or slot devices 74, for accommodating and holding the shafts of idler gears, to coact with gears on tool spindles in any of the four positions. Thus, for each work spindle there may be a corresponding rotary tool spindle, which tool spindle may be rotatable either in the same direction or in the opposite direction from the work spindles.

At the upper end of the frame is an auxiliary cam shaft 75 (Figs. 1, 2, and 5) which, in the form shown, carries a pair of cam drums 76, 77. The auxiliary cam shaft 75 is driven through a sprocket 78 and chain 79 from a sprocket 80, carried by the main cam shaft 27. In order to provide for adjustment of the cam drums 76, 77 relatively to the drums on the main cam shaft 27, one sprocket may be slotted, as indicated at 81, and secured in any suitable adjusted position by means of a bolt or cap screw 82. On either of the drums 76, 77 or between the two there may be cam dogs 83, which may actuate clutch mechanism (not shown) for a threading spindle in one of the available positions heretofore indicated.

The upper cam shaft 75 may also be utilized for actuating the stock stop 84 (Figs. 1, 4a), which, in the form shown, is on a shaft 85 supported in a bearing on the bar 4 and is moved by the two part rotatable rod or shaft 85, 85', carrying a pinion 86 (Fig. 4) meshing with a rack lever 87, actuated by a cam 88 on the shaft 75. At the high point of the cam 88 the rack lever 87 is shifted, so as to throw the stock stop in position to stop the stock, and after the stock has been chucked the stock stop is moved out of the way to a limit stop, and the rack lever engages the long dwell portion of the cam 88. We provide means for permitting the stock stop to be manually actuated when desired. In the form shown the shaft part 85 has fixed thereto collar having a handle and detent 85" to engage a depression in shaft 85' so that normally the two part shaft 85, 85' will be actuated by the cam 88, as described. However, the handle may be manually actuated to disengage the detent 85" from the shaft part 85' and rotate the shaft part 85 so as to move the stock stop 84 out of the way to permit an operator to remove the short end of stock, or to move the stock stop for any other purpose. The operator need not manually reengage the detent for when the cam 88 again moves the shaft part 85', the detent will be automatically reengaged and the stock stop will thereafter be operated normally by the cam.

*End working tool slides*

As stated, there may be rotatable tools corresponding to all positions of the work spindles. In the embodiment illustrated, upper rotatable tool spindles, such as 67, are provided, and such spindles will usually be for accelerated tools, such as threading, high speed drilling, and the like. The tool spindle 67 may be rotated, as heretofore described, by the gearing shown more particularly in Figs. 1 and 5. The spindle is carried at the forward end by a head or slide 90, which may be guided upon the guide rod 91 secured to the side face of the tie bar 4 and also between a guide bar 92 and the side face of the top plate 4. If desired, the head 90 may also or alternatively be guided upon the main tool slide to be later described. The head 90 may be adjustably secured to a rod 93, which may be secured to a slide 94 (Figs. 4 and 5), which is slidably guided on the frame of the machine. A cam roll 95, to be engaged by cams on the upper cam shaft 75, serves to feed the slide 94 and through the rod 93, the head 90, and spindle 67, as desired. A rotatable tool in the upper rear position 70 may likewise be fed by a slide 96 and cam roll (not shown). Rotary tools in the lower tool positions 68 and 69 may be fed from the main cam shaft 27 or the upper cam shaft 75, but normally such lower tools would be fed by the main tool slide to be later described.

The threading tools which, in the machine illustrated, would normally occupy one of the upper tool positions 67 and 70, may be suitably rotated alternately faster and slower than the work spindle by a clutch mechanism and gearing well known in the art and therefore not herein illustrated. It will thus be seen that the rotary tools may be fed independently of the main tool slide so as to get any desired feed thereof.

Figure 7:
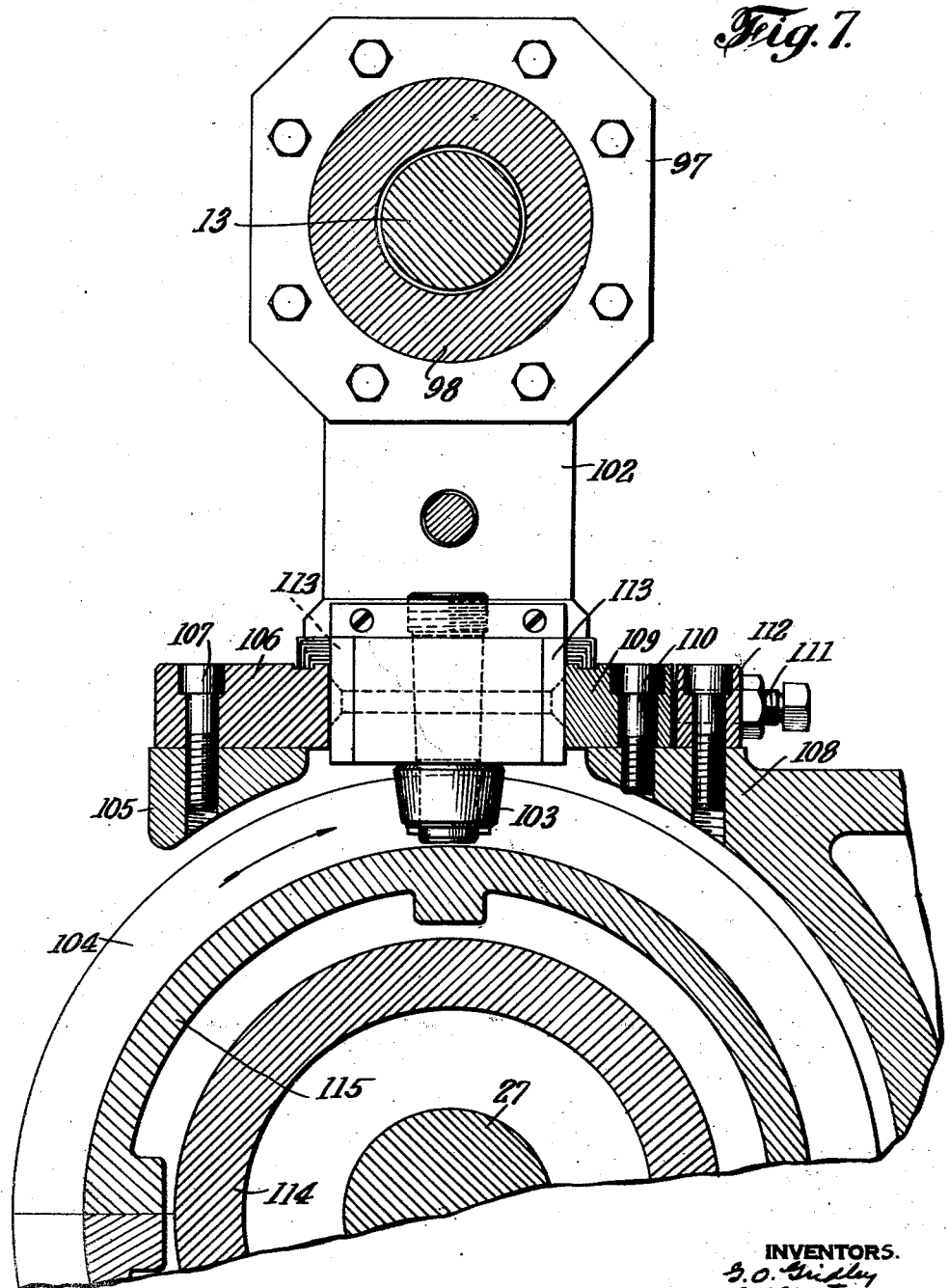
Fig. 7 is an enlarged sectional view taken substantially in the plane of the line 7—7 of Fig. 1, illustrating particularly a tool slide guide.

The main tool slide 97 may be of a more or less familiar type and is slidably guided upon the stem or arbor 98, which may be rigidly carried by the spindle carrier and it may be rotatably but nontranslatably carried in a heavy thrust bearing 99 at the power case end of the frame. It is desirable to thus support the stem 98 against end movement so that all or a part of the tool thrust on the carrier may be taken by the stem 98 and bearing 99. The slide 97 (Figs. 1 and 7) preferably fits the stem 98 (except perhaps for oil grooves), so as to prevent any substantial bending of the stem 98 and thus insure accuracy. The slide 97 may be provided with suitable slots or ways 100 for receiving various types of tool holders, such as 101, to be secured thereon at the location desired.

Novel means have been devised for guiding the slide 97 and preventing rotation. As shown more particularly in Figs. 1 and 7, the main tool slide 97 is provided with a rear plate or guide arm which extends downwardly, and at the lower end carries a cam roller 103, to be engaged and fed by suitable cam members 104, actuated by the main cam shaft 27. A part 105 of the frame carries a hardened guide block 106, which is preferably fixedly mounted thereon, as by means of screws 107. An oppositely disposed portion 108 of the frame carries a second hardened wear block 109, which is mounted for adjustment toward and from the guide block 106. The guide block 109 is secured by screws 110 to the part 108 of the frame. Adjusting screws 111 in a fixed part, such as the block 112 on the frame part 108, serve to position the guide block 109, so that the lower portion of the arm 102 may be accurately guided and rotation of the main tool slide 97 effectively prevented. The guide arm 102 carries hardened wear blocks 113, 113 for coaction with the guide blocks 106, 109. It will be seen that with the direction of rotation of the cam 104 in the clockwise direction as viewed in Fig. 7, substantially all of the cam pressure will be transmitted to the adjustable wear block 109, while the guide block 106 will normally serve only as a guide and will be subjected to little or no wear. Any wear taking place between the wear block 109 and the interengaging wear block 113 may be taken up by loosening the screws 110 and adjusting the adjusting screws 111. Thus accuracy of movement of the main tool slide 97 is always assured. The guide block 106 may be very accurately made and positioned at the factory once and for all and, under normal conditions, will not require any adjustment, all adjustments being made on the side where the maximum wear normally takes place. The tool slide 97 is thus effectively guided on the stem 98 during its reciprocating movements and is very accurately held against rotation by the means just described.

The cam surfaces 104 may be in the form of semi-cylindrical or other multi-part sleeves or drums, secured to the main drum 114 on the cam shaft 27. We may also employ with the small main drum 114 an adapter 115, which, if desired, may be cored out for lightness and upon which cam strips may be secured. The adapter, as well as other cam parts, are preferably semi-cylindrical or other multi-parted, so that they may be readily installed and removed.

Cross slides

As intimated heretofore, the machine in its preferred form is symmetrically designed about the spindle drive, and in the interest of production, as well as flexibility, there is opportunity for installing both fixed and rotary end working tools in each and every position of the spindle carrier. With the same ends in view, cross or forming slides are preferably provided for each spindle. The cross slides may be so designed and arranged that tools and parts are readily interchangeable between all or some of the cross slides so as to permit of a ready selection of tools as well as positions at which those forming tools are to act. The cross slides in the preferred form are of novel construction, comparatively simple to manufacture, exceedingly sturdy in construction and rendering it possible to do the most accurate type of work at a high rate of speed. The cross slides are all so arranged so that there is perfect freedom for the disposal of chips and so that the slides and their guides are not likely to become worn due to the entry of chips and dirt on the guiding surfaces.

In the preferred embodiment each cross slide guide is in the form of a cylindrical stud, or is at least in part cylindrical, thus facilitating accurate manufacture at comparatively small cost. The body of each cross slide is provided with a bore having a cylindrical, or at least partly cylindrical, surface to interfit with the corresponding surface on the guide. As shown more particularly in Figs. 1, 8, and 9, each lower cross slide guide is in the form of a cylindrical stud having a substantial bearing in the frame part integral with the spindle carrier housing and secured to such frame part as by means of a substantial outside flange 117 and screws 118 (Fig. 1). The relatively short heavy studs are substantially as solid and sturdy as the frame itself which supports them. Since the guide studs are cylindrical or at least partly cylindrical (since obviously a stud with a flat thereon would probably be almost as good as a complete cylindrical stud) they may be very accurately turned and ground and even lapped without any accurate or painstaking hand scraping operations.

Each lower cross slide comprises in general a body portion 119 provided with a bore portion to accurately fit the stud 116. The body portion 119 is preferably split as indicated at 120, and the two sides of the split bore may be secured together preferably with the interposition of shims by means of bolts 121 so that should any wear take place a shim may be removed and reground to compensate for the wear which has occurred. The shims are then reinserted and the bolts simply tightened up to again secure an accurate and satisfactory fit between each stud and its slide bore. The lower cross slides are each provided with an upstanding guide arm 122 which may be integral therewith. Each guide arm may be guided, as shown more particularly in Figs. 1, 8, and 9, between a wear block 123 on the main frame and an oppositely disposed guide block 124 secured thereto and spaced therefrom so as to permit the introduction and accurate guiding of the upper end 125 of each guide arm 122. Thus, each lower cross slide is rigidly held and accurately guided in its sliding movement by means of its stud 116, and by the simple means including the guide arm 122 the slide is effectively prevented from any rotative movement during its sliding action.

It has been found in practice that the rigidity with which the slides are held during the times that the tools are acting appears to be greater than that provided merely by accurate guiding surfaces. It is believed that this exceptional rigidity is due to the fact that the guide bores serve to restrain the inevitable tendency of each stud to bend slightly under tool pressure and in so bending more tightly grip the bore in the slide. At any rate, and for whatever cause, it has been found that the cross slides of the type disclosed are exceedingly sturdy and serve to rigidly hold the tools in position so as to obviate any chattering.

On the face of each slide is a tool slide plate 126 which is securely though removably secured thereto. Such plate 126 may be provided with T slots or the like 127 for securing tool holders in various positions. These tool slide plates 126 are preferably of the same size for all of the cross slides so that they may be readily interchanged with the tools in place, if and when desired.

The end of the bore in each slide is preferably closed as by means of a plate 128 so that in effect each guide stud 116 and its coacting slide constitutes a cylinder and piston. Thus, when the slide is moved forward, a partial vacuum is produced between the end of the stud and the closed end of the cylinder, and such partial vacuum prevents the slide from overrunning the cam at the end of the stroke. Similarly, on the return stroke of the slide, the air which has leaked into the cylinder will serve to cushion the slide at the end of its back or return stroke. This cylinder and piston effect is of itself of considerable importance in its cushioning and holding action, but may also be taken advantage of for lubricating the slide surfaces.

Each guide stud, or the cylindrical bore surface, or both, may be provided with one or more oil grooves 129 extending therearound and preferably extending to the end of the stud. The inner end of the groove, preferably at a part which is always covered by the slide or frame, communicates with a pipe or tube 130, the end of which is subjected to an oily atmosphere, for example, the space above the oil surface in an oil reservoir (diagrammatically shown). Thus, each slide in its forward or feeding movement will draw air and oil mist or particles onto the surfaces between the guide stud and the slide and thus effectively lubricate the same. Air being forced out through the pipe 130 will serve to agitate the air in contact with the oil and tend to produce a further oily mist which is again sucked into the interior of each slide cylinder. If the slides act very rapidly, as they are designed to do in the present high production machine, the pipe 130 should not extend below the oil surface since the oil could not get out of the cylinder fast enough and the head 128 might be blown off on the return stroke. The method of lubrication above described has been found highly satisfactory for the present slides. Only a slight amount of oil is applied at each stroke, but what is more important, that slight amount is applied at each stroke so that the slides are continuously lubricated.

The upper forming slides may be of substantially the same construction as those heretofore described. In the present embodiment, however, a single stud 131 is securely held in the top plate as by means of a split bearing drawn up by bolts 132. As will be understood, instead of a single double-ended guide stud 131 separate guide studs, similar to those provided for the lower slides, could be employed. There is a particular advantage in employing separate studs at the bottom, in that the space between the slides provides a very free and unobstructed space for the dropping of chips. The upper slides 133 may be of the same form and act the same as the lower slides just described. The upper slides are provided with tool slide plates 134, which, as intimated above, are preferably interchangeable with each other and preferably with the plates 126 of the lower cross slides. The upper slides being supported from the center rather than from the edge of the frame, as is the case with the lower slides, have bores closed at the outer ends as by means of plates 135. Thus, on the feeding stroke, each upper slide 133 is prevented from overrunning its feed cam at the end of its stroke by a pressure in the cylinder closed by the plates 135. The upper slides may be lubricated in the same manner as the lower slides and as described and shown in connection with one of the lower slides. The upper slides 133 are guided against rotative movement by means of arms 136, which may be functionally and structurally substantially the same as the arms 122 heretofore described for the lower slides. The arms 136 may be guided between the same blocks 123—124 which serve to guide the lower cross slides against rotation.

Figure 9:
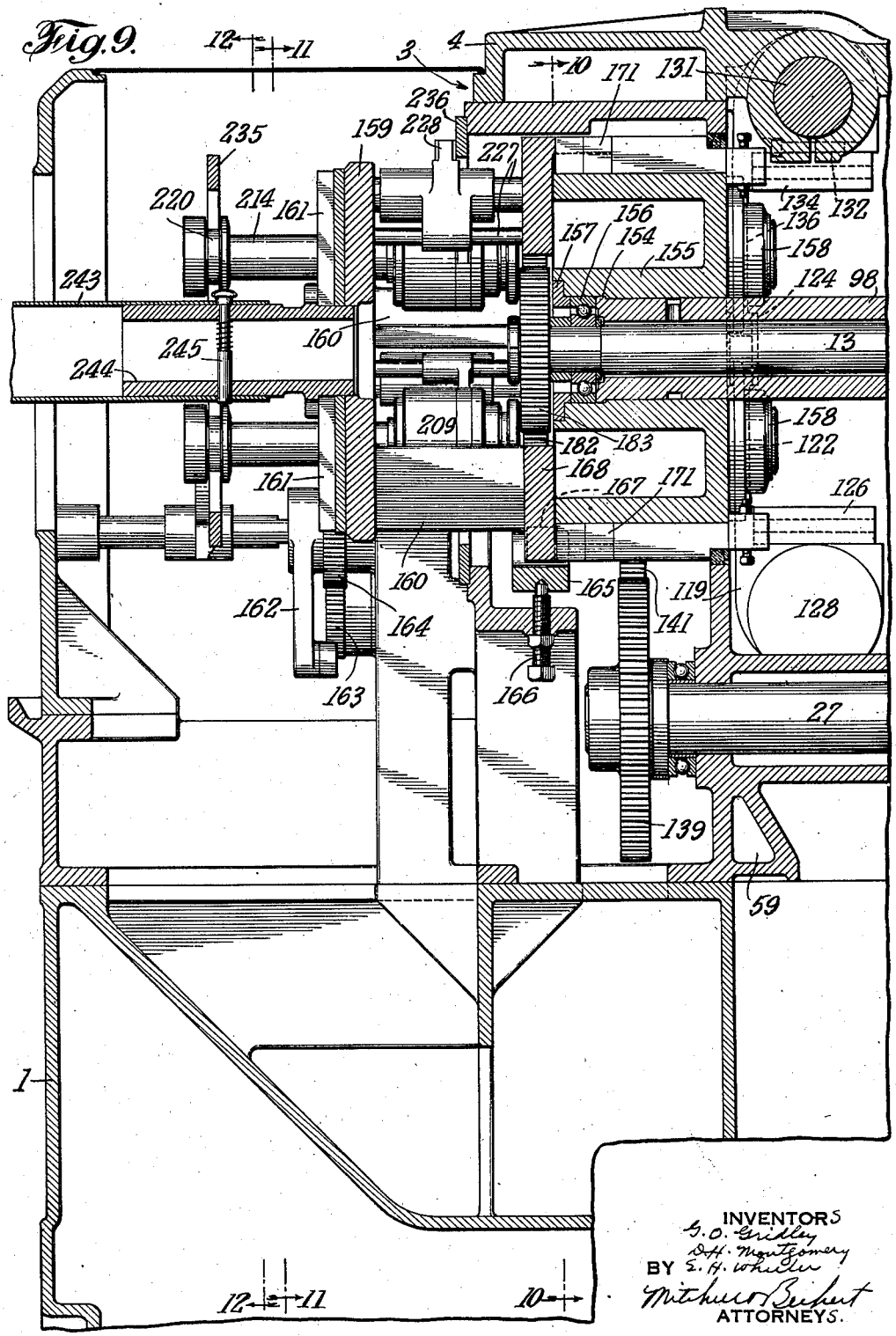
Fig. 9 is a central sectional view taken substantially in the plane of the line 9—9 of Fig. 8.
Figure 10:
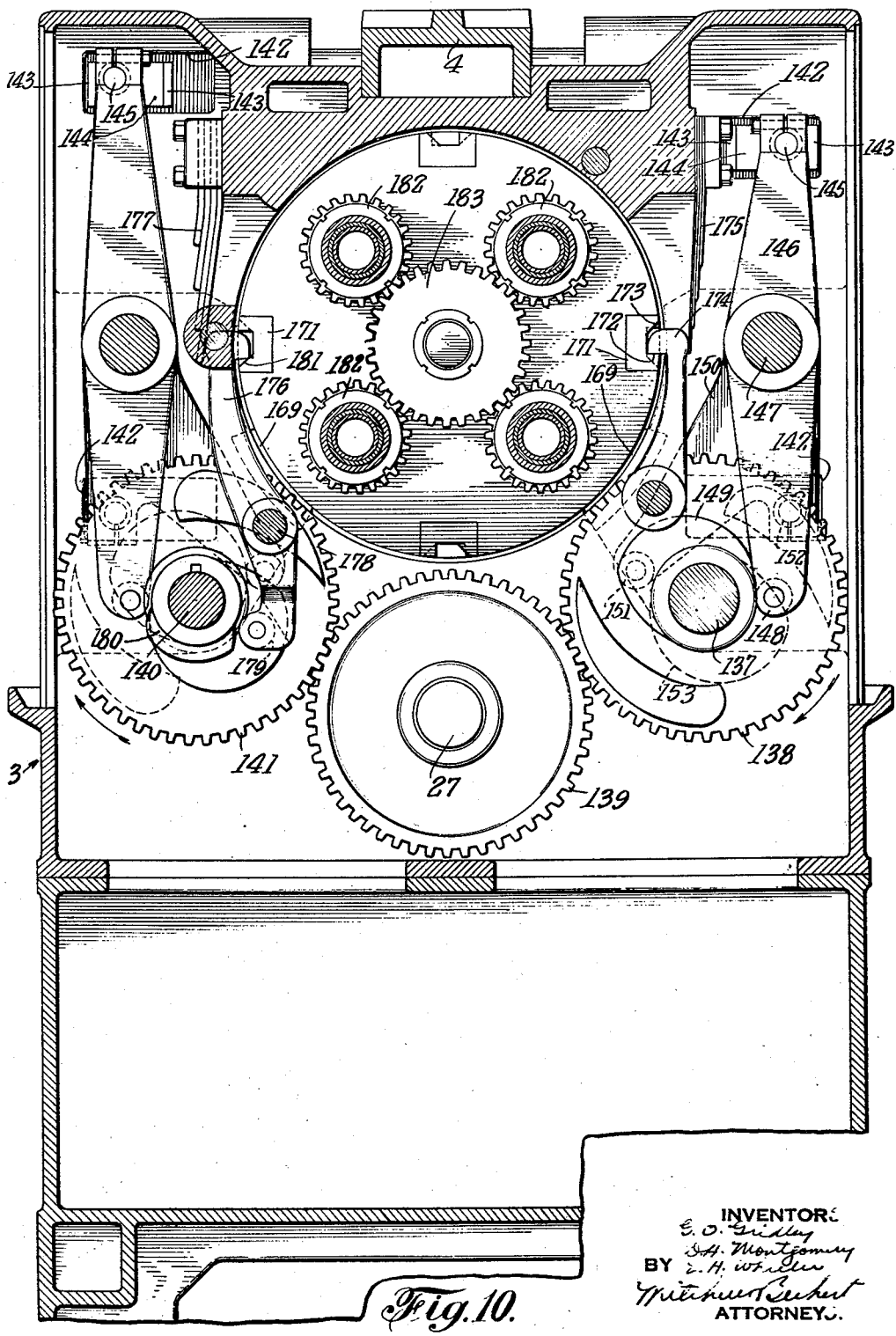
Fig. 10 is a sectional view taken substantially in the plane of the line 10—10 of Fig. 9.
Figure 21:
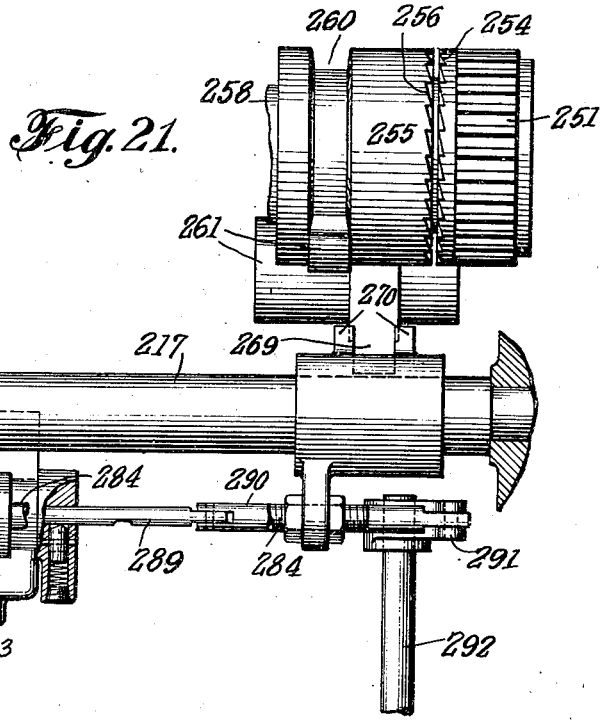
Fig. 21 is a fragmentary view in partial section of chuck and clutch controlling means shown in part in Fig. 17.

The cross slides are fed preferably by means of cams and levers positioned longitudinally rearwardly of the slides and of the spindle carrier face and generally upstanding transverse wall of the frame at the spindle carrier face (Fig. 9). In the particular embodiment shown, the main cam shaft 27 extends rearwardly to about the middle of the spindle carrier (see Figs. 1, 9, 10). A front auxiliary cam shaft 137 is journaled in the frame and is driven by means of a gear 138 from the drive gear 139 on the main cam shaft 27. The cam shaft 137 serves also to actuate the chucking and feed slides when the invention is embodied in a screw machine. A second auxiliary cam shaft 140 is journaled at the rear of the frame and is driven by means of a gear 141 from the drive gear 139. The frame is provided with openings 142 through which the cross slide feed mechanism extends for feeding the cross slides. Each upper cross slide (Fig. 10) is provided with a vertical slot defined by wear blocks 143—143 in which slot the block 144 carried by a pin 145 fits. The block 144 and pin 145 are carried by a feed lever 146 pivoted at 147 to the frame and extending downwardly. The lower end of the lever 146 carries a cam roll to be engaged by a plate cam 149 on the auxiliary cam shaft 137 or as specifically shown on the left side face of gear 138 (Figs. 1 and 10). Thus, when the roller 148 is engaged by the plate cam 149, the lever 146 will be rocked to feed the upper cross slide. The feed of the slides may, of course, be varied by a change of cams or a change of the length or pivoting of the lever. In the form shown, the rear upper cross slide is arranged for slightly greater movement than the upper front slide.

Each lower slide is actuated in the same manner as the upper slide, and, as illustrated, there is a lever 150 having a cam roll 151 at the lower end, which lever may likewise be pivotally mounted on the shaft 147. Each lever 150 carries a pin 152 and a block similar to the block 144 heretofore described, as will be clearly understood. Each roller 151 is engageable by a plate cam 153 on the right hand side of gears 138, 141 as viewed in Fig. 1 (see also Fig. 10) for feeding each lower slide. Thus, all four slides may be actuated independently of each other and at rates dependent upon the particular lever arms and cams selected. Thus, great flexibility of action is possible. Draw back cams are provided and are preferably carried on the gears 138, 141 as shown, so as to withdraw the forming slides and clear the machine for indexing, as will be understood. It will be clear that the upper and lower front slides are actuated from gear 138 and the rear slides from gear 141 and by substantially duplicate mechanisms. By reason of our construction torque in the shafts 137, 140 due to heavy forming cuts is practically eliminated.

*Spindle carrier or turret*

The spindle carrier or turret may be of any desired form. As illustrated, it is of barrel type and is preferably supported, as heretofore stated, against endwise movement under tool thrusts by means of the tool slide guide stem 98, which, as stated, is held in a heavy thrust bearing 99 (Fig. 1) at the power case end of the frame. The spindle carrier end of the stem 98 may have a flange at the end as indicated at 154, which flange fits into a counterbore in the central hub 155 of the spindle carrier and may be held therein in any suitable manner as by means of the outer ring 156 and abutment plate 157 of the ball bearing supporting the end of the spindle drive shaft 13 as indicated more particularly in Fig. 9. The spindle carrier carries a plurality of spindles, designated generally 158, in this case four spindles being indicated, the details of which will be later described. The spindle carrier may be indexed by any suitable means, and in the present case a flange or plate 159 is secured as by means of circumferentially spaced webs or lugs 160 to the rear of the spindle carrier, and this flange or plate has secured thereto a Geneva wheel having four slots 161 for the reception of the roll of index arm 162 which may be driven through spur gears 163—164 from the auxiliary cam shaft 140. The support designated as a plate or flange 159 is of importance in that in addition to carrying part of the index means it may also support many other members in whole or in part, for example the stock tube, rear ends of spindles, chucking or clutching mechanism, etc.

The spindle carrier during indexing is preferably anti-frictionally supported and between indexing movements is rigidly supported by the frame. In the form shown, we provide a relatively stiff spring saddle 165 supported upon an adjustable bolt 166 (Figs. 9 and 11), which saddle is provided at the ends with rollers 167—167 to bear beneath the rear portion 168 of the spindle carrier. At the time when the spindle carrier is not locked in position, the adjusting screw 166 is set so that the spindle carrier is lifted just clear of the spaced frame abutments 169, upon frame webs shown in dotted lines in Fig. 10, upon which it is normally supported between indexing movements. The spindle carrier is normally raised by the spring saddle 165 only a few thousandths of an inch, that is, just sufficient to clear the abutments 169 during indexing. At an upper part of the frame portion 3 may be a roller 170 (Fig. 11), positioned to bear against the rear plate portion 168 of the turret when raised. A second roller 170' may be positioned to bear against the rear plate 168 and is located about opposite the locking arm 174 for a purpose to be described. Thus the turret is supported on the rollers 167—167 at the bottom, and when raised sufficiently will engage the rollers 170—170' so that the spindle carrier may be said to be rolled around on the rollers during indexing. The features relating to the supporting of the spindle carrier or turret out of engagement with the main frame supporting means during indexing, disclosed herein, are claimed in our divisional application, Serial No. 740,780, filed August 21, 1934, and are claimed broadly in our application, Serial No. 394,232, filed September 21, 1929.

The turret is locked against indexing movements and strongly drawn down and held against the frame abutments 169—169 so as to be very rigidly supported. It may be noted at this point that by raising the spindle carrier out of engagement with the abutments 169 while indexing, those abutments or supports are not worn by the sliding of the turret thereon and serve merely as supports and not as rotative bearings. In the form shown, the spindle carrier is provided with inset blocks, each block having a substantially radial bearing surface 172 at one side and an inclined cam surface 173 opposite thereto. A locking arm 174 is pivoted to the frame and is pressed as by means of a spring 175 into the position shown in Fig. 10 with the locking surface of the arm in engagement with the radial surface 172 in the block 171. When the spindle carrier is indexed in a clockwise direction as viewed in Fig. 10, the nose of the locking arm 174 is engaged by the cam surface 173 and is cammed out of the locking slot in the block 171 and thereafter rides along the outer surface of the turret until the turret has indexed so as to bring the next locking slot into position to be engaged by the locking arm 174. At the side of the spindle carrier opposite the arm 174 is a second locking arm 176 which is urged inwardly by a very heavy spring 177. The locking arm 176 is pivoted to the frame at 178 and the lower end is provided with a cam roll 179 to be engaged by a cam 180 on the auxiliary cam shaft 140. As indicated above, the locking arm 174 is readily cammed out by the inclined surface of the slot and against the comparatively light spring 175, while the other locking arm 176 is positively withdrawn by the cam 180 against the very heavy locking spring 177. Each portion of the set in block 171 which is engaged by the heavy locking arm 176 is provided with a cam surface 181 which is not strictly radial but is slightly inclined so that the locking arm in reaching the position shown in Fig. 10 wedges or jams the spindle carrier down against the frame supports or abutments 169—169 and the spindle carrier is thus very firmly held against movement. With the tool slide guide stem 98 resisting axial movement of the turret and the very solid holding and supporting of the spindle carrier on the abutment surfaces 169—169 against movements in any direction, the spindle carrier is very solidly and firmly positioned during the working periods. At this point, the fact may be mentioned that lubricant supplied through the hollow tool slide spindle stem 98 serves to lubricate the ball bearing of the spindle drive shaft 13. Through one or more openings in the guide stem 98, the main tool slide 97 may likewise be lubricated.

During indexing of the spindle carrier the nose of the locking lever 174 bears rather forcibly against the carrier by reason of the spring 175, and of course tends to shift the spindle carrier laterally. This lateral shifting is resisted by the roller 170', positioned as stated about opposite the point at which the lever 174 engages the spindle carrier, and the latter being thus supported on the rollers 170', 170 and saddle rollers 167, 167 may be indexed with comparative ease.

*Spindles*

The spindle carrier is provided with a plurality of spindles (in this case four), which are rotatably mounted therein and which are of novel design and arrangement permitting exceedingly high rotative speeds and permitting ready interchangeability for converting a machine from one size to another. The spindles embodied in a screw machine may likewise be provided with a novel form of chucking means of very simple construction and efficient, readily adjustable, and highly efficient in use.

In the form shown (Figs. 10, 13, and 14), each spindle 158 is provided at the rear of the spindle carrier with a gear 182 meshing with a central drive gear rigidly carried by the main central drive shaft 13 extending through the stem 98 and driven from the power case end of the machine. Thus, the spindles are all driven in unison, and, in the form shown, at identical speeds.

Each spindle, as shown more particularly in Fig. 13, and a spindle of different size in Fig. 14, is mounted on anti-friction bearings such as ball bearings which are preloaded. The spindle carrier is recessed for interchangeably receiving spindles of different sizes whereby the machine may be readily converted from one size to the other.

Figure 8:
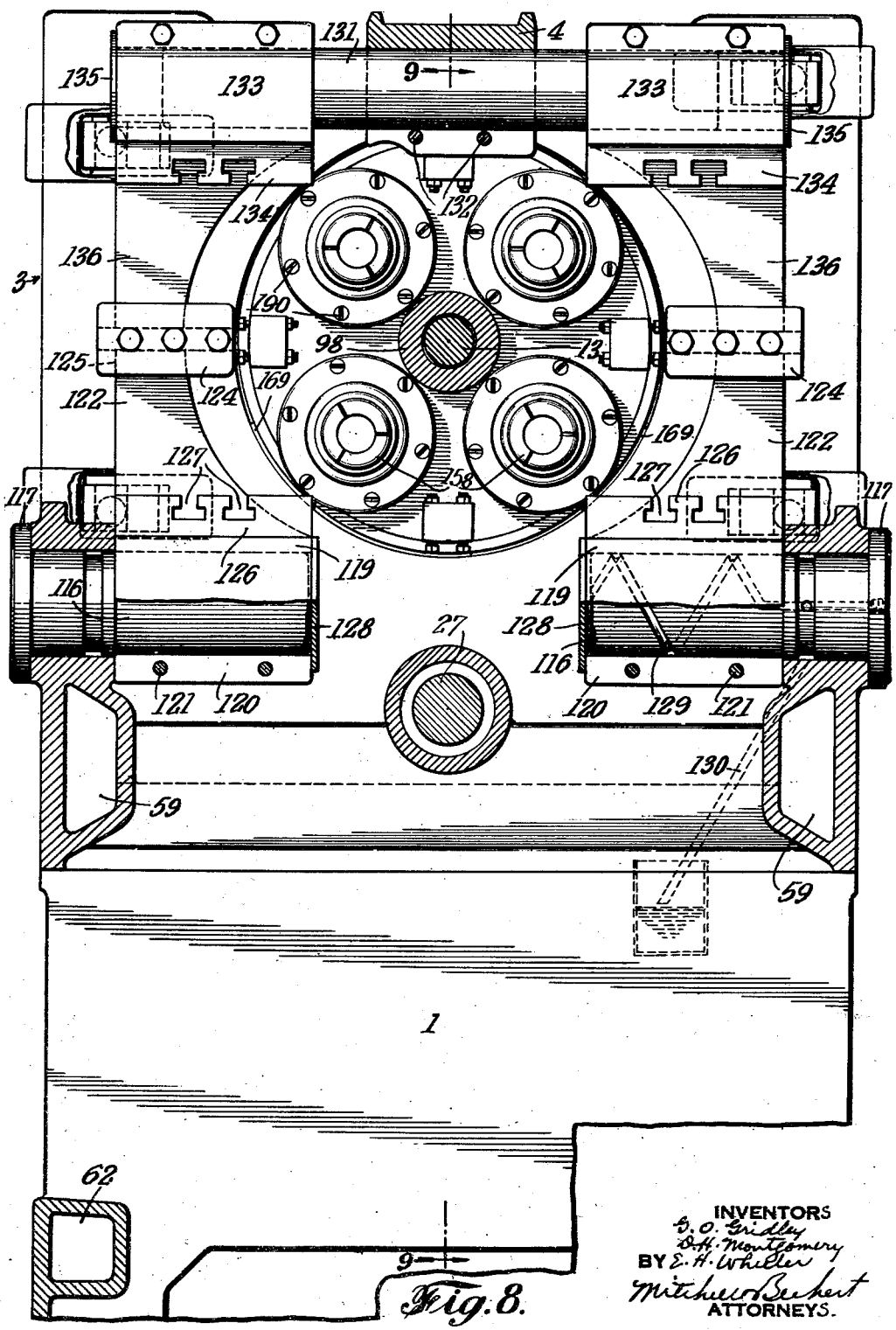
Fig. 8 is a sectional view taken substantially in the plane of the line 8—8 of Fig. 1, parts being broken away to illustrate interior construction.

Referring particularly to Fig. 13, each spindle comprises a tubular member 184, which, compared in length with spindles now in use, is exceedingly short. We have found in practice that for spindles on a two-inch machine the spindles may be about twelve inches long, which is half or less than the length of spindles now in use on machines of corresponding size. The spindle carrier is recessed for receiving the tubular spindles 184 with the interposition of anti-friction bearings. In the form illustrated each spindle bore in the spindle carrier has a shoulder 185 at the rear end. Anti-friction bearings of the angular contact type are provided, one at the front and one at the rear of the spindle. The outer ring 186 of the rear bearing abuts the shoulder 185. A short tubular spacer 187 abuts the ring 186 and the outer ring 188 of the front bearing abuts the spacer 187 and the assembly is held in place by a substantial flange or ring 189 secured to the face of the spindle carrier as by means of screws 190 (Fig. 8). The inner ring 191 of the forward bearing abuts a shoulder 192 on the tubular spindle. A spacer sleeve 193 abuts the ring 191 and the inner ring 194 of the rear ring, and by means of a spacer 195, the drive gear 182, and a lock nut 196, the inner rings and spacer 193 are held in assembled relation. By making the outer spacer sleeve 187 slightly longer than the inner spacer sleeve 193, the bearings may be given any preloading desired, depending upon the difference in the lengths of the sleeves 187—193, as will be understood. The preloaded bearings thus very accurately hold the spindles against longitudinal movement under tool pressure.

By making the spindles exceedingly short and spacing the bearings quite close together and preloading the same, there is produced a spindle which may be rotated at an exceedingly high rate of speed considering its diameter, and there can be no whipping action such as is so common, when an attempt is made to rotate the long spindles with widely spaced bearings now in use. The relatively short sleeves 187—193 may be very accurately ground to definite lengths, thus making it relatively easy to secure just the desired preloading of the bearings. The above are all advantages attributable to the ultization of exceedingly short spindles. There are other advantages, among which are the very substantial shortening of the spindle carrier with a consequent shortening of the overall length of the machine, both features of considerable importance under present day conditions.

Heretofore, when it has been desired to change the size of a machine by the substitution of a smaller spindle for a larger one, it has been usual, so far as we are aware, to place a liner or adapter sleeve in the spindle bore of the spindle carrier and employ smaller bearings for the smaller spindle. By means of our novel construction we may substitute a smaller spindle having larger bearings for a larger spindle with smaller bearings and consequently require no liners or adapter sleeves, though some form of liner might be employed without departing substantially from the scope of our invention. As shown particularly in Fig. 14, in which the parts are numbered the same as in Fig. 13 with a prime, the outer rings 188'—186' and the inner rings 191'—194' may be held in the spindle carrier and on the spindle as heretofore described. It is to be noted, however, that the balls in Fig. 14 are of much larger diameter than the balls in Fig. 13. This is as it should be and is an advantage flowing from our novel method of substituting one size of spindle for the other. Thus, the large spindle of Fig. 13 may be rotated at some maximum speed. The smaller diameter spindle may be, and ordinarily would be, rotated at a much higher rate of speed than the larger spindle, and for the higher speeds larger balls should be provided in order to stand up and take the loads which at a slower rate of speed could be taken by smaller balls. Thus, by providing the spindle carrier with bores for interchangeably receiving large spindles with small balls and smaller spindles (for higher speeds) with larger balls, we are at once able to readily change the size of the machine and at the same time provide adequate bearing capacity for both larger and smaller spindles. The provision of the very short spindles with independent bearings arranged relatively close together, together with the attendant advantages, we consider important features of the invention.

*Chucking and stock feed*

We have also devised an improved form of chucking means for the spindles. In the form shown, each spindle nose is provided with inclined ways 197, with which inclined surfaces on collet jaws 198 coact, whereby when the jaws are drawn rearwardly by the chucking or collet tube 198, a rod will be chucked, and when the collet tube is permitted to move forward, the rod will be unchucked, as is common in machines of this sort.

A particularly novel feature is the means for actuating the collet 198. In the form illustrated the tubular spindle 184 or, more properly, a sleeve member 199, keyed thereto at 200 and abutting the end of the spindle at 201, carries an abutment member or ring 202. The collet tube itself carries a second abutment member or collar 203, which may be held by means of a nut 204 on the collet tube. In the form shown the collar 203 is capable of endwise movement relatively to the spindle limited by the length of the groove 205 and an abutment ring or wire 206 on the sleeve 199. The abutment collars 202—203 are provided with surfaces inclined to each other, as by inclining one surface 207 on the ring 202. One or more wedge devices, such as balls 208, are interposed between the abutment surfaces of collars 202—203, and since these collars have surfaces inclined to each other, it will be apparent that forcing the balls 208 radially inwardly will cause a separation of the collars 202—203, and since the collar 202 cannot move forwardly, the collar 203, and through it the nut 204 and collet tube 198, will be drawn rearwardly to cause the draw-back collet jaws 198 to grip the stock. If the balls are permitted to move radially outwardly, the collet tube 198 may move forwardly so as to cause the collet jaws to release the stock.

As a means for forcing the balls 208 radially inwardly, we prefer to employ a sleeve member 209 having a sliding bearing on the abutment sleeve 199 and shiftable as by means of a fork 210, as will be understood. The chucking sleeve 209 is provided with an inclined surface 211 whereby when the sleeve 209 is moved rearwardly, the balls will be cammed inwardly to chuck the rod and when the inner cylindrical surface 212 of the sleeve rides over the balls they are definitely held in the chucking position. In the position of the sleeve 209 shown in Fig. 13 the parts are in unchucked positions.

The chucking device just described is of such construction that all parts are concentric with the spindle axis and may be easily and accurately turned out. Since all parts are concentric with the spindle, there are no unbalanced rotating weights, and high speeds are thus attainable. The chucking device is very readily adjusted by a mere setting up or backing off of the nut 204. By the means described, a very simple, efficient, readily installed, and adjusted mechanism is provided and one which may be made relatively cheaply of very simple parts and which when completed is exceedingly compact. The chucking means described is claimed in divisional application, Serial No. 47,044, filed October 28, 1935.

The stock may be fed in the usual manner by means of feed fingers 213 carried by the feed tube 214 slidable in the collet tube 198 as will be understood. The rear flange plate 159 on the turret may carry a bearing such as a roller bearing 215 for assisting in supporting the feed tube and a part of the weight of the stock carried thereby at the rear portion of the feed tube.

The feed tube 214 and the chucking device, whether embodying a collet chuck or otherwise, may be actuated in the usual or any desired manner. In the form shown I employ a feed slide (Figs. 1, 12) slidably guided longitudinally of the machine on a pair of guide bars 217—218. This slide carries an extended feed shoe 219 in position to engage the groove 220 in each spool on the feed tube. The feed shoe 219 is preferably resiliently held on the feed slide 216, as by means of studs 221—221 and springs 222 which serve to urge the slide to the position indicated in Fig. 12. A handle 223 and lever (Figs. 1 and 12) are provided so that the feed shoe 219 may be withdrawn toward the left as viewed in Fig. 12, to release the spool on the feed tube from engagement with the feed shoe 219, so as to permit withdrawal of the feed tube for repairs or for other reasons, such as replacing feed fingers. The feed slide 216 also carries a return shoe 219', positioned forwardly of the feed tube spool and which serves to return the feed tube to its normal rear position when the feed shoe 219 is out of engagement with the feed tube spool. The feed slide 216 (Fig. 1) is moved in the feeding direction preferably by means of a spring 224, and the limit of movement thereof is controlled by a feed cam 225 (which serves as a draw back for the slide), carried by the auxiliary cam shaft 137. It is to be observed that normally the cam roll 226 on the feed slide does not reach the bottom of the cam 225 as viewed in Fig. 1, since the stock is stopped by the stock-stop 84 when the spring has moved the feed slide forward sufficiently for that purpose. As shown in Figs. 1 and 12, we provide means for latching the feed shoe 219 in its retracted position and also means for automatically causing the same to reengage the feed tube spool properly. The feed slide 216 may carry a pivoted latch 216', which may normally hang down and be supported on the head 221' on the guide stud 221. Now, when the handle 223 is moved so as to withdraw the feed shoe 219 from the spool groove, the head 221' is moved so as to permit the latch 216' to drop down behind it and thus hold or latch the feed shoe 219 in its withdrawn position. The feed tube may then be withdrawn for any purpose desired. It is to be observed that the return shoe 219' remains in position and the feed tube spool may be bumped thereagainst when stocking up. When the feed tube is in place the return shoe 219' serves to move the same rearwardly upon the draw back of the feed slide. Thus, with the return shoe in engagement with the feed tube spool the latter will be positioned in alignment with the feed shoe 219, so as to be engaged therewith upon unlatching of the feed shoe. When the feed slide 216 approaches its rearward limit of movement the latch 216' engages a knock-off abutment 216" on the frame and the latch is raised out from behind the head 221', and the springs 222 then return the feed shoe to normal position in engagement with the spool groove. It will be clear that the feed shoe may be unlatched manually, but the automatic unlatching just described is an important feature of convenience and safety. It is only necessary to see that the feed tube is positioned forwardly of its drawn back position, to be assured that the return shoe will draw the tube back and at the same time position the same so as to be properly engaged by the feed shoe 219 when the same is automatically unlatched by the abutment 216", as described.

The chucking sleeve 209 (Fig. 13), as heretofore stated, may be actuated by a fork 210, one being preferably provided for each spindle and slidably mounted upon a stud or other bearing 227 as shown more particularly in Fig. 11. Each chucking fork 210 may be provided with a finger 228 in position to be engaged by a slotted shoe 229 carried by the chucking slide 230. The chucking slide is likewise preferably slidably guided upon the two guide bars 217—218 heretofore mentioned. The chucking slide 230 may carry a cam roller 231 to be actuated by cams 232 on a drum of the auxiliary cam shaft 137. The shoe 229 on the chucking slide need not be as extensive circumferentially as the feed shoe 219 for a purpose to appear. When the auxiliary cam shaft 137 rotates so that the unchucking cam 233 forces the chucking slide to the right as viewed in Fig. 1, the chucking sleeve 209 is moved to the right as viewed in Fig. 13 and the stock unchucked. At that time and before the chucking portion 234 of the cam again chucks the work, the spring 224 forces the feed slide to feed the stock up into engagement with the stock-stop. Very soon after the stock has been fed, the chucking cam 234 moves the chucking slide 30 to the left as viewed in Fig. 1 to again chuck the stock, and upon further rotation of the auxiliary cam shaft 137 and while the spindle carrier is indexing, the feed tube slide 216 is drawn rearwardly by the cam 225. Thus, it is necessary to have the feed slide shoe 219 sufficiently long to permit the groove of the feed tube spool to remain in engagement therewith during indexing but the chucking slide having accomplished its purpose before the index need not be sufficiently extensive to be in engagement with the finger 228.

Figure 5:
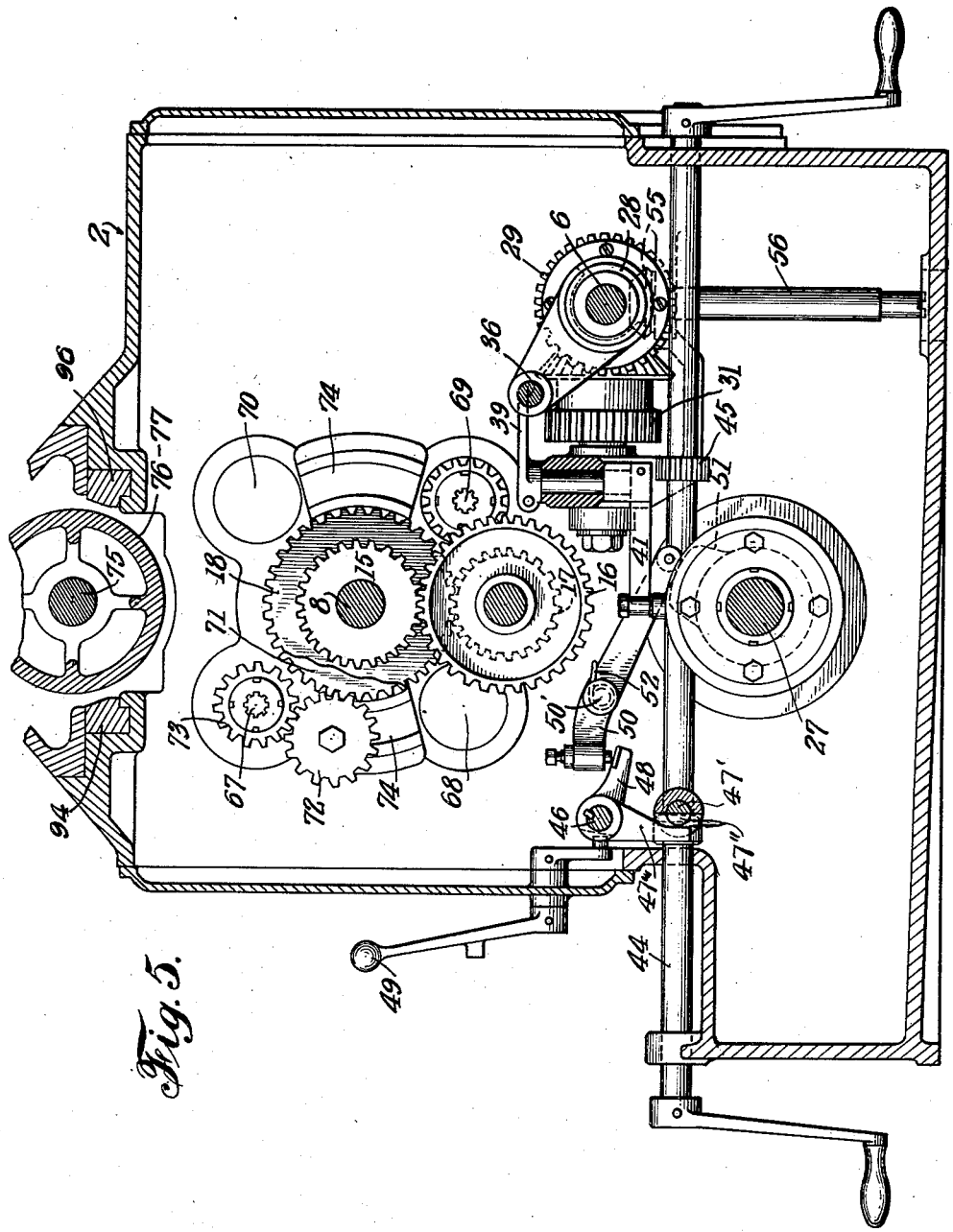
Fig. 5 is a sectional view taken substantially in the plane of the line 5—5 of Fig. 3.

The feed tube spools 220 not in engagement with the feed shoe 219 are held in the rear or drawn-back position by means of a fixed but adjustable shoe or track 235, and it is to be observed that the cam 225 is so proportioned that by the time the next succeeding feed tube spool has been indexed around to where it should be engaged by the feed shoe 219, the latter will have been drawn rearwardly so as to receive such spool when it indexes into the position, for example, as shown in Fig. 12. The guide fingers 228 of the chucking slide when not in engagement with the chucking shoe 229 are held in chucked position by means of a fixed shoe or track 236, so that there is positive assurance that the chuck cannot open accidentally. It will be seen (Fig. 1) that between the unchucking cam 233 and the chucking cam 234 there is substantial space. This space is to permit the chucking slide to be actuated by hand when those cams are properly positioned over the cam roller 231. The provision for hand operation of the chucking slide is desirable in that when setting up the collet or other chuck may be tested for proper grip on the stock. The semi-automatic stop mechanism heretofore described in connection with Figs. 3 and 5 is so arranged as to stop the chucking cam in proper position to permit hand operation of the chucking slide. In order to permit such manual actuation we provide a lever 237 engaging in a slot 238 in the chucking slide and provided with an angular hub 239 for engagement by a wrench, so that the chucking slide may be manually moved back and forth at will. During the rotation of the auxiliary cam shaft 137, the chucking slide is normally held in the straight or dwell groove 232, so as to be positioned to receive the finger of the next chucking fork upon the next index.

The stock reel

In order to permit more rapid indexing and generally for making all parts of the machine as rigid and maintaining same in alignment so far as possible, we prefer to positively rotate the stock reel with the spindle carrier. As shown more particularly in Figs. 15 and 16, the stock reel 240 may be supported at the rear by means of the standard 241, having the rollers 242, as is common practice. Secured to the reel 240 is a tube or other equivalent device 243, which interfits with a part of the spindle carrier, such as the tubular stud 244, secured to the flange plate 159 of the spindle carrier. A releasable pin arrangement 245 permits engagement and disengagement of the connecting tube 243 and the stud 244. A second reel or spider 246 may be secured upon the connecting tube 243. The stock tubes 247 are rotatably held in the two reel spiders 241—246, preferably on roller bearings 248, to facilitate free and easy rotation thereof. In a machine designed for very high speed production and high spindle speeds, it is desirable that the stock tubes be freely rotatable with the stock, and with a spindle carrier designed to index very rapidly it is desirable that as much strain as possible be removed from the rapidly rotating stock, and these results are accomplished by positively rotating the stock reel with the spindle carrier rather than rotating the latter through the bars of stock themselves.

Chucking machine modifications

The machine may be very readily converted into a chucking machine by making provision for stopping the rotation of one spindle after each indexing. We have devised novel means for clutching and unclutching each spindle from its driving means when it reaches the loading position. We have also devised novel fluid pressure chucking means and prefer also to employ fluid pressure for actuating the spindle clutch. In the interest of simplicity of operation and to facilitate rapid chucking, unchucking, clutching, and unclutching, we prefer to employ a single handle for accomplishing all of those functions. The modifications which we may make for converting the screw machine into a chucking machine are shown more particularly in Figs. 17 to 23. Various features relating to clutching and chucking, which will be described herein, are claimed in divisional application, Serial No. 82,424, filed May 29, 1936.

Each chucking spindle 250 may be supported in the spindle carrier in substantially the same manner and on anti-friction bearings as has been heretofore described in connection with the screw machine, and the advantages heretofore noted are, of course, inherent in a chucking machine as well as in the screw machine. In the form shown, and referring particularly to Fig. 18, it will be noted that the main spindle drive gear 183 drives a ring gear 251 rotatably carried on each spindle as by means of a double row bearing 252. The inner ring of the bearing is preferably rigidly carried directly on the spindle 250 while the outer ring is rigidly carried in a recess or bore of the ring gear 251. An advantage of an anti-friction bearing at this point is that when the spindle is unclutched from the drive gear and the drive gear continues to rotate, there is practically no tendency for the spindle to be dragged along with the drive gear, and stopping of the spindle is thus greatly facilitated. We have devised a most advantageous type of clutch device by means of which the spindle is positively driven and yet no difficulty is experienced in engaging the positive clutch regardless of the normal speed of the driving portion thereof. In the embodiment of the invention herein disclosed, we employ a positive type of bump or toothed clutch for positively driving the spindle during its normal and working rotation, and in order to permit such a desirable and positive type of clutch to be employed at the high speeds at which we desire to employ it, we provide a friction pick-up which initiates the rotation of the spindle and brings it to such a speed, that is, a speed approaching the driving portion of the positive clutch, that the positive clutch may be engaged without difficulty.

In the form illustrated, the ring gear 251 or any part which rotates therewith is provided with a driving clutch part 253, having positive clutch teeth 254 thereon. The spindle carries a coacting clutch part, in this case in the form of a sliding sleeve 255, having clutch teeth 256 to engage with the teeth 254. The sleeve 255 is splined at 257 to what we term an abutment sleeve 258, which is itself splined at 259 to the spindle 250. The sleeve or spool 255 is provided with a groove 260, so that the sleeve may be actuated by a fork part 261 (Figs. 17-18), as will be later described. The abutment sleeve 258 is adjustably held in desired longitudinal position on the spindle by means of an adjusting nut device 262, so that it may be moved forwardly or rearwardly for purposes of adjustment, as will be described. Opposite the inner end of the abutment sleeve 258 is a second abutment sleeve or collar 263, which may abut or form part of a friction clutch device 264 formed of plates, one or more of which may be carried by the ring gear, and one or more of which may be carried by the spindle or a part rotatable therewith, so that when the abutment collar 263 is moved toward the right as viewed in Fig. 18, the friction clutch device will be engaged and the spindle will rotate with its driving ring gear 251. In order to cause engagement or disengagement of the friction clutch device we employ wedge members, such as balls 265, which may be carried in pockets or slots in the end of the abutment collar 263. The surfaces on the abutment collar 263 and on the abutment sleeve 258 are inclined to each other, in this case by beveling off the edge of the abutment sleeve 258. Thus, it will be seen that by moving the balls radially inwardly, the tendency will be to separate the abutment members 258—263, and since the abutment member 258 is rigidly held by the adjusting nut 262, the abutment collar 263 will be moved toward the right, to cause the friction clutch 264 to be engaged. The positive clutch sleeve 255 is provided with a bell-mouthed opening 266, so that when the clutch sleeve 255 is in its left-hand position as viewed in Fig. 18, the balls 265 may move radially outwardly to permit disengagement of the friction clutch device 264.

Now, when the sleeve 255 is moved toward the right, the balls 265 will be moved radially inwardly by the tapered or bell-mouthed opening of the clutch sleeve 255, and thus the friction clutch device 264 will be engaged and the spindle 250 will be rotated thereby. Within the sleeve 255 is a cylindrical opening 267 to maintain the balls in their radially inward position. When the spindle 250 has picked up speed, whether it be the same speed as the drive gear 251 or slightly less, the positive clutch sleeve 255 may be moved farther towards the right, so as to cause the enlargement 268 in the clutch sleeve opening or counterbore to be positioned over the balls, and the balls are thus permitted to move radially outwardly and to disengage the friction clutch device 264. Further movement of the positive clutch sleeve 255 will cause the positive clutch teeth 254—256 to be engaged with each other, and since the friction clutch device has already initiated the rotative movement of the spindle 250, there will be no difficulty in causing the positive clutch teeth which are now rotating to engage with each other without clashing or grinding of teeth. When it is desired to stop the spindle, the clutch sleeve 255 is merely moved toward the left, which action first causes the positive clutch teeth to become disengaged and which incidentally in the form shown causes the friction clutch device to be engaged and immediately thereafter causes the friction clutch means to be disengaged by the radially outward movement of the balls 265 when they enter the tapering or bell-mouthed opening of the sleeve.

Adjustment of the friction clutch pick-up means is readily effected by turning up the adjusting nut 262 so as to bring the two abutment sleeves closer together. Wear in the friction clutch device is thus compensated for. It will be seen that by means of our improved clutch device the spindles may be rotated at exceedingly high rates of speed and by a positive clutch. The friction clutch portion of our device acts only as a spindle speed pick-up device and does not, in the preferred form, drive the spindle at times when work carried by the spindle is being acted upon by the tools. At such times, the spindle is being driven by the positive clutch with all the attendant advantages of such a clutch.

It might be here stated that in the preferred form each spindle clutch is provided with its independent fork device 261 (Fig. 17) which may be slidably mounted upon the studs 227 heretofore described and employed in the screw machine for supporting the chucking slide in the screw machine. Each fork device 261 is also provided with a finger 269 which may be engaged with a track or slide shoe portion 270 (Figs. 17, 21), which may be fluid pressure actuated as will be later described. Each fork 261, or, rather, the finger portion 269 thereof of each spindle in other than the chucking position, may be engaged and held against endwise unchucking movement by a track ring 271 in the same manner in which the chucking spools in the screw machine were held during indexing; in fact, the same forks and guide tracks may be employed in both the screw and chucking machines and the forks merely engage with the clutch sleeve of each spindle in the chucking machine rather than with the chucking sleeve of the screw machine.

The chucks of the chucking machine are preferably fluid pressure actuated. The chucks may be of any desired type, and we have illustrated (Fig. 18) a rather well-known type of two-jaw chuck which is actuated to close the same by a rearward movement of the draw rod and to be opened by a forward movement thereof. In the chucking machine, each spindle is preferably lengthened somewhat, though the spindle of the chucking machine is much shorter than those heretofore in use with which we are familiar.

In the preferred form we employ a cylinder and piston for each chuck, and the cylinders are preferably so arranged as to be non-rotatable even though the spindles themselves are rotatable at high speed. A rear portion of each spindle may be provided with an additional anti-friction bearing 273, and at the extreme rear end of the spindle is an anti-friction bearing 274, which supports the non-rotatable cylinder unit 275 of desired form. The cylinder unit 275 is provided with fluid pressure inlet and outlet ports or passages 261—277 at opposite sides of the piston 278. The piston has projecting gudgeons 279—280, which project respectively at the rear and forward ends of the cylinder and which may fit relatively tightly. Stuffing boxes may, if desired, be provided, but, generally speaking, a relatively tight fit will serve to retain the pressure fluid in the cylinder, and if oil, for example, is the pressure fluid, a slight leakage of oil is rather advantageous for lubricating various bearings and parts adjacent to the leaks. Mounted on the piston gudgeon 279 is an anti-friction bearing 281, which supports a frame or yoke device 282, which is rigidly but adjustably secured to the rear end of the draw rod 272, as by means of a screw threaded connection and a lock nut 283. It will be seen that, with the cylinder 275 held stationary, the spindle 250 may rotate relatively thereto by reason of the bearing 274. Likewise, the draw rod 272, by reason of the bearing 281, may rotate relatively to the piston. The piston 278 may rotate to some extent in the cylinder, but under normal conditions the principal rotation will be between the draw rod 272 and the piston.

As stated, the spindle clutch and chucking mechanisms are preferably actuated by fluid pressure, though other means could be employed without departing from the scope of the invention in certain of its aspects. For the purpose of actuating the spindle clutch through the fork device 261 and the shoe or track actuator 270 we preferably employ a fluid pressure piston and cylinder. The track actuator 270 may be in the form of a bracket device slidably mounted upon the rods 217 and 218 on the frame of the machine, as heretofore described. A piston rod 284 may be adjustably secured to the bracket 270 and be actuated by a fluid pressure piston 285 in a cylinder 286, to be described more in detail. The flow of fluid pressure to opposite ends of the cylinder 286 is controlled by a piston valve 287 in a valve casing 288, which piston valve may be manually actuated through its rod 289, link 290 and crank 291 on shaft 292, which may be manually rocked by a handle at any convenient position on the machine.

The fluid pressure connections and the flow of fluid may be traced best by reference to the diagrammatic showing of Fig. 23. In the present embodiment the device is arranged so that all of the chucking cylinders in positions other than the loading position are maintained in chuck-closing position by direct pump pressure, while the cylinder of the spindle in loading position is initially actuated by fluid from an accumulator, the pressure on the actuated piston being thereafter maintained constant by the pump after the accumulator pressure has caused it to operate. In the form shown we employ a pump, such as a gear or other positive type pump, 293, one branch 294 of the discharge side of which communicates with a passage 295 in the accumulator valve housing. A spring pressed valve 296 acts as a pressure regulating valve, to permit the entry of high pressure fluid from the line 294 into the accumulator bell 297. The setting of the valve 296 determines the limit below which the pump discharge pressure may not fall during normal operation. A differential relief valve 298 is provided which is forced to the position indicated in Fig. 23 by the pump pressure fluid. When the accumulator is charged, the pressure of the accumulator fluid shifts the valve 298 to uncover the relief passage 299 to discharge excess fluid from the accumulator. When the system is shut down the pump, of course, ceases to furnish pressure fluid and the spring pressed valve 296 is moved to the extreme left as viewed in Fig. 23, so as to permit the accumulator to drain through the dotted line port of the valve 296 and the drain pipe communicating with the spring chamber of the valve. During normal operation the pump pressure maintains the valve 296 in a right hand position to blank off the dotted line port therein.

We may employ a valve 300 urged upwardly by a spring 302. This valve normally closes the discharge from the accumulator, and pump pressure fluid may flow through port 301, beneath the valve skirt, and then through ports in skirt to cylinder line 303 to maintain the piston 278 in chucking position in its extreme position. When the chucking lever is actuated to shift the valve 287 as above described, there will be a quick flow of pump fluid through cylinder line 303, port 304, etc., thus momentarily reducing the pump pressure below the valve 300, and the accumulator pressure, being momentarily greater, will shift the valve 300 to cause the skirt of the valve to cut off the port 301 to thus maintain pump pressure on the cylinder in working positions and the accumulator will discharge through cylinder line 303 to shift the piston 278 in loading position. When the pressure in the accumulator drops, the spring 302 moves the valve 300 to again close the accumulator discharge to line 303 and again permit direct pump pressure to enter cylinder line 303 to either complete movement of the piston 278 in chucking position, or, if its movement is completed, to maintain the same under static pump pressure. Thus the large volume of accumulator pressure fluid is available for shifting the chucking piston in loading position and direct pump pressure is available for completing the piston shifting and maintaining the same under static pump pressure. An operation may then be performed on a work piece chucked in loading position.

The other branch 305 from the discharge side of the pump communicates with an inlet passage 306 in the distributor sleeve 307, which is secured to the frame. Within the sleeve and normally in fixed rotative position is a distributor plug 308, and an annular passage 309 is provided, preferably in the plug itself, so that there is a constant communication between the pump inlet passage 306 and such annular passage. Communicating with the annular passage 309 is a longitudinal passage 310 in the plug, which communicates at the forward end of the latter through a side outlet 311 with an interrupted annular groove passage 312 in the plug. The groove 312 extends circumferentially about three-quarters of the way around the plug.

The spindle carrier itself or some part indexible with the chucking cylinders 275 carries a sleeve 313, fitting but indexible with the cylinders about the normally fixed plug 308. The sleeve 313 in the plane of the line 20a—20a (Fig. 19) is provided with four outlet passages 314, 315, 316, 317, each of which passages is connected, as by means of a pipe 318, 319, 320, 321, respectively, with the tail end of the chucking cylinders 275. Pressure exerted on said tail end serves to draw each draw-rod 272 in the chucking direction. Thus it will be seen that with the plug 308 and sleeve 313 in the position shown in Fig. 20a, the tail ends of three of the cylinders will be in communication with the interrupted annular groove 312, and consequently in communication with the longitudinal passage 310, annular groove 309 in the plug, inlet passage 306 in the frame sleeve 307, and the discharge side 305 of the pump. Consequently, the three chucks in the positions other than loading position will be constantly held closed by high pressure fluid directly from the discharge side of the pump.

The distributor sleeve 313 is provided in the plane of the line 20—20 (Fig. 19) with passages 322, 323, 324 and 325, which are in communication, respectively, through pipes 326, 327, 328 and 329 with the head ends of all of the chucking cylinders. The plug 308 is provided in the plane of the line 20—20 of Fig. 19 with an interrupted annular groove 330, with which the passages 323, 324, 325 are in open communication, as shown in Fig. 20, so that the head ends of each of the cylinders, other than the one in the loading position, are in open communication with such interrupted annular groove. Communicating with that groove 330 is a longitudinal passage 331, which communicates with an exhaust opening 332 (Figs. 19, 23), for example, with the space between the two sleeves on the plug. Thus, the head end of each of the cylinders, other than the one in the loading position, will be in constant communication with the atmosphere, while the tail ends of each of those same cylinders will be in constant communication (Fig. 20a) with high pressure fluid directly from the discharge side of the pump.

The plug 308 is provided with a longitudinal passage 333 in constant communication with an annular groove 334 in the plug. Passage 333 is in communication at one end through a plug radial passage 335 with the port or passage 317 communicating through the pipe 321 with the tail end of the cylinder in loading position. The plug 308 is provided with another longitudinal passage 336, which communicates with an annular groove 337 in the plug, and at its opposite end communicates through a radial passage 322' (Fig. 20), pipe connection 322 in sleeve 313, and through pipe 326 with the head end of the cylinder in loading position, that is, the upper cylinder in Fig. 23.

The annular plug passage 334 which, as stated, communicates with the tail end of the cylinder in loading position, is connected through pipe connection 338 and pipe 339 with the top pipe connection 340 in the clutch cylinder 286. The annular plug passage 337 which, as stated, is in communication with the head end of the cylinder in loading position, communicates through the pipe connection 341 and pipe 342 with an end passage 343 in the control valve casing 288.

The operation is as follows:

With the parts in substantially the position shown in the drawings, and referring particularly to Figs. 19 to 23, it will be seen that the three chucks in working position are closed and held closed by high pressure fluid directly from the discharge side of the pump. The fluid pressure actuated spindle clutches heretofore described are likewise closed, so that the three spindles in working positions will be rotating with the chucks closed and held closed with the maximum force. The spindle in loading position, that is, the upper position in Fig. 23, has the spindle drive clutch thrown out, so that the spindle is stationary and the chucking piston is in its forward position, so that the chuck is open. The control valve handle has been thrown over to the right to the position indicated as "1st" (Fig. 23).

Figure 22:
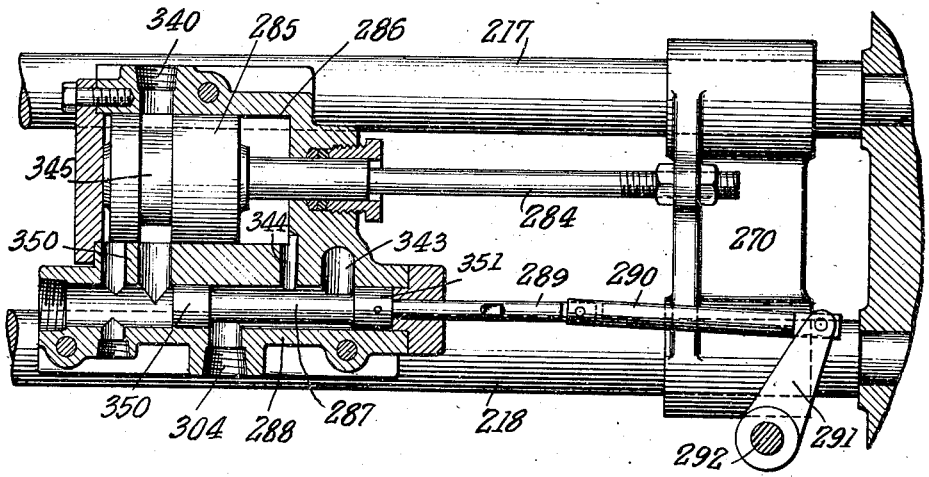
Fig. 22 is a view in section of parts shown in Fig. 21, the section being taken substantially in the plane of the line 22—22 of Fig. 17.

It may then be seen that the spindle clutch has been thrown out by accumulator pressure fluid which has passed from the accumulator through pipe 303, pipe connection 304, into the annular space between the ends of the piston valve 287, and then through the passage 344 and into the tail end of the cylinder 286, thus maintaining the spindle clutch piston 285 in the left-hand position as viewed in Figs. 22 and 23. At the same time the tail end of the chuck cylinder in loading position will be in communication through the pipe 321, passage 317 (Fig. 20a), passages 335 and 333, annular passage 334, pipe connection 338, pipe 339 and pipe connection 340 in the clutch cylinder 286, the annular piston groove 345 in the clutch piston 285, and through the passage 346 in the control valve cylinder, with the exhaust passage 347.

Accumulator pressure fluid is free to flow from the space between the pistons of the control valve through port 343, pipe 342, pipe connection 341 and longitudinal plug passage 336, passage 322', pipe connection 322 and pipe connection 326 to the head end of the cylinder in loading position, and thus cause the chucking piston of the cylinder in loading position to remain forward and the chuck open.

A new piece of work may then be inserted in the chuck. The manual valve control handle is then shifted to the position indicated "2nd" in Fig. 23, which places the end piston 349 so as to be positioned under the partition or barrier 350, and the rear piston head 351 between the port 343 and the port 344. In this position accumulator pressure fluid entering through pipe 303 and passage 304 is still permitted to pass through passage 344 into the tail end of the clutch control cylinder 286, so as to maintain the spindle clutch in unclutched or open position. At the same time the pipe 342 leading to the control plug 308, and eventually to the head end of the cylinder in loading position, will be opened to the exhaust passage 347, and accumulator pressure fluid may pass through pipe 303, pipe connection 304, passage 346, annular passage 345, pipe connection 340 and pipe 339, and eventually to the tail end of the cylinder in loading position, so as to close the chuck. The spindle will still be unclutched but the work will now be chucked.

In order to close the spindle clutch the manual control valve handle is thrown toward the left to the position indicated "3rd" in Fig. 3. This movement will place the control valve 287 in the extreme left-hand position. It will be seen that accumulator pressure fluid through the pipe 303 and central connection 304 may still pass momentarily through passages 346, 345 to pipe 339, to the tail end of the cylinder in loading position, so as to maintain the work chucked, but at the same time the tail end of the cylinder 286 is in communication through the passage 344 and to the right of the right-hand piston 351 of the control valve with the exhaust passage 347 and the head end space 352 of the clutch cylinder 286 will then be in communication with the source of accumulator pressure between the two heads of the piston valve, and the clutch piston 285 will be moved toward the right, so as to throw the spindle clutch in, and the spindle rotation will then be started. After the shift of the clutch piston 285 to the right to close the clutch accumulator fluid may still reach the tail end of chucking cylinder in loading position by passing by the head end of cylinder 286 and through pipe 339, etc., to maintain that chuck closed.

After the turret or spindle carrier has indexed, another spindle will then arrive in loading position, and it will be in the same condition that the spindle which just left the loading position was in, that is to say, the spindle will be rotating and the work will be chucked. The manual control valve handle is then shifted to the right, back to the position indicated "2nd". Then, through the pipe connections heretofore described, the tail end of the clutch cylinder 286 to be put in communication with accumulator pressure fluid and the head end 352 of that cylinder will be put in communication with the exhaust, so that the clutch piston 285 will be shifted toward the left and will again occupy the position shown in Figs. 22 and 23, and the spindle clutch will be thrown out but the work will still be clutched. The manual control valve handle would then be shifted farther toward the right, to the position designated "1st", which is the position in which the parts are in Figs. 22 and 23. This further shifting of the control valve to its extreme right hand position will still permit accumulator pressure to maintain the clutch piston 285 in its left hand position, so as to maintain the clutch open, but through the pipe connections heretofore described the tail end of the cylinder in chucking position will be opened to the atmosphere, and the head end will be opened to accumulator pressure, to open the chuck, so as to again permit the insertion of a new work piece.

Thus briefly, with the parts in the position shown in Figs. 22 and 23, the first shift of the manual control handle to the "2nd" or intermediate position will cause work to be chucked. Further movement of the handle to the extreme left or "3rd" position will cause the spindle to be clutched, and thereafter the spindle carrier indexes. Another spindle then reaches the loading position. Movement of the manual control handle toward the right to the "2nd" position will cause the spindle to be unclutched, and further movement of the control valve handle back to the extreme right, or "1st" position, as shown in the drawings, will cause the work to be unchucked. Thus the cycle is completed.

It is often desirable in a machine of this character to permit a chuck in any position to be opened, for example so that a faulty piece of work may be removed. With that end in view we have provided means for rotating the distributor plug 308 from its normal position, as shown in the drawings, so as to place the various passages heretofore described into communication with the various cylinders. For example, it will be clear that with the holding or detent lug device 353 (Fig. 19) withdrawn to the position shown in Fig. 19, the handle 354 may be moved so as to rotate the distributor plug 308 to any position desired, so as to cause the passages now in communication with a particular cylinder to be placed in communication with any of the other cylinders. In fact, if it were desired, the loading position of the machine could be almost instantly changed merely by shifting the distributor plug 308 to the appropriate position.

While we have disclosed many features of novelty having structural or functional utility, it is to be noted that we have disclosed only preferred forms, and that many changes, modifications, additions, and omissions may be made within the scope of the invention as defined in the appended claims.

We claim:

1. In a machine of the character indicated, a frame, a plurality of rotatable spindles at one end of said frame, a power case at the opposite end of said frame, two shafts in said power case mounted parallel to said spindles, sprockets on said shafts, a main cam shaft, and means for driving said cam shaft from both of said sprocket shafts at different times, means for driving said spindles from one of said shafts, said sprockets being mounted on said shafts at the end of said frame opposite said spindles and being readily removable and interchangeable with other sprockets for effecting speed changes.

2. In a machine of the character indicated, a frame, a cam shaft, means for driving said cam shaft at different rates of speed, a second cam shaft mounted substantially vertically above said first-mentioned cam shaft, driving sprockets for said cam shafts, and a chain connecting said sprockets whereby one of said cam shafts will be driven directly from the other.

3. In a machine of the character indicated, a pair of pumps, and means for driving the same, one of said pumps being connected to a source of cutting fluid, the other of said pumps being connected to the discharge side of said first-mentioned pump and serving as a booster to supply cutting fluid at a high pressure.

4. In a machine of the character indicated, three pumps, and means for driving the same, one of said pumps being connected to a source of lubricating oil, one of the other of said pumps being connected to a source of cutting fluid, and the last of said three pumps being connected to said second-mentioned pump and serving as a booster therefor to supply cutting fluid at a high pressure.

5. In a machine of the character indicated, a frame, three pumps, a driving shaft directly connected to one of said pumps for driving the latter, and gear means connecting said shaft with said other two pumps for driving the latter, one of said pumps being connected to a source of lubricating oil, another of said pumps being connected to a source of cutting fluid and supplying cutting fluid at low pressure, and the third of said pumps being connected to a source of cutting fluid and supplying the latter at a relatively higher pressure, for the purpose described.

6. In a machine of the character indicated, a frame, a work holder, a tool holder, means for moving the same relatively to each other including a cam shaft, means for driving the same including a clutch, a clutch shaft, a handle for throwing said clutch, and manually movable means articulated with said clutch shaft, and means for actuating said manually movable means from said cam shaft at a predetermined position thereof for throwing said clutch.

7. In a machine of the character indicated, a work holder, a tool holder, a normally continuously rotatable cam shaft for controlling the feed of said work and tool holders relatively to each other in a continuous cycle, means for driving said cam shaft including a clutch, and cam controlled means for said clutch manually movable at will into the path of a cam, whereby said cam will serve to throw out said clutch and stop the rotation of said cam shaft.

8. In a machine of the character indicated, a work holder, a tool holder, actuating means for the same including a feed cam clutch for normally acting in a continuous cycle, and manually movable means actuable at will during a cycle and articulated with said clutch and operable by a cam means at a predetermined point in the rotation of said cam means.

9. In a machine of the character indicated, a work holder, a tool holder, feed means for feeding the same relatively to each other, said feed means being normally continuously rotatable in a continuous cycle, and means to be set by hand and actuatable by said feed means for stopping the latter at a predetermined point in the cycle of said feed means.

10. In a machine of the character indicated, a work holder, a tool holder, feed means for feeding the same relatively to each other, said feed means being normally continuously rotatable in a continuous cycle, and means to be set by hand and actuatable by said feed means for stopping the latter at a predetermined point in the cycle of said feed means and maintaining the same stopped until said manually movable means is again moved.

11. In a machine of the character indicated, a work holder, a tool holder, feed means including a cam shaft for feeding said work holder and tool holder relatively to each other, means including a clutch for driving said cam shaft, a clutch shaft and means manually movable to start and stop said cam shaft, a manually movable lever device for said clutch shaft, and means operable by said cam shaft for engaging said manually movable lever device when in one position, to move said clutch shaft for throwing out said clutch at a predetermined point in the cycle of said cam shaft.

12. In a machine of the character indicated, a plurality of work holders symmetrically arranged about a common axis, a plurality of tool holder positions likewise symmetrically arranged about said axis, a main drive gear for rotating a tool in any of said tool positions, and means for adjustably holding an idler gear and confining movement of its axis to an arc concentric with said main drive gear whereby said idler gear may always mesh with said main drive gear and the gear on a tool holder in either of two adjacent tool positions.

13. In a machine of the character indicated, a plurality of spindle holding positions arranged equidistantly from a common axis, and means intermediate said positions for adjustably holding an idler gear so as to mesh with a gear on a spindle in either of said positions, said means including an arc shaped path to confine movement of the axis of said idler to a path concentric with said common axis.

14. In a machine of the character indicated, a frame, a main cam drum in the lower portion thereof, a tool operable thereby, an auxiliary cam drum means at the extreme upper portion of said frame, means for driving said drums synchronously, and a pair of tool slides mounted symmetrically at opposite sides of said auxiliary cam drum means whereby tools may be fed independently thereby.

15. In a machine of the character indicated, a frame, a main cam drum in the lower portion thereof, an auxiliary cam shaft at the extreme upper portion thereof, auxiliary cam drums mounted one behind the other on said auxiliary cam shaft, a tool fed by one of said auxiliary cams by means at one side of said drums, and a second tool fed by the other of said cams at the other side of said drums.

16. In a machine of the character indicated, a work spindle, a pair of tool spindles, a common drive shaft for said spindles, a gear on said shaft meshing with a gear on said work spindle, a gear on said shaft in position to mesh with a gear on either of said tool spindles, and means adjacent said tool spindles for adjustably and removably holding an idler gear in position to mesh with gears on either of said tool spindles and the gear on said main shaft adjacent thereto, whereby said work spindles may and tool spindle will be rotated in opposite directions.

17. In a machine of the character indicated, a frame, a main cam shaft at the lower portion thereof, a tool actuated thereby, a plurality of cam drums arranged one behind the other on a shaft at the extreme upper portion of said frame, cam means on said drums for driving a plurality of upper spindles, and a cam dog intermediate said cam drums, for actuating clutch mechanism for one of said upper spindles.

18. In a machine of the character indicated, a work holder, a tool holder, feed gear means for feeding said work and tool holders relatively to each other, a power feed clutch for controlling said feed gear means, hand cranking means for said feed gear means including a hand cranking shaft, an abutment on said shaft, and a detent movable by said abutment to permit said hand cranking shaft to be moved in to engage the hand cranking gear means, said detent and power feed means having means to prevent said detent from being moved by said abutment when said feed clutch is in.

19. In a machine of the character indicated, a work holder, a tool holder, feed gear means for moving the same relatively to each other and including a power clutch means, means for throwing said clutch to an in and an out position, hand cranking means for said feed gear means, a detent device, means connecting said detent device and clutch throwing means for holding said detent device in one position, and an abutment means associated with said hand cranking mechanism and engageable with said detent means to prevent said hand cranking mechanism from being thrown in when said clutch is in the in position.

20. In a machine of the character indicated, a work holder, a tool holder, feed gear means for moving the same relatively to each other and including a clutch, hand cranking means for said feed gear means, a detent device movable to one position by said hand cranking means when the latter is thrown into operative position, and means associated with said clutch throwing means and engageable with said detent device to prevent said clutch from being thrown in when said hand cranking mechanism is in operative position.

21. In a machine of the character indicated, a frame, a slide, means for slidably supporting the same, means for non-rotatably guiding said slide, and a cam for feeding said slide, said means for non-rotatably guiding said slide comprising a pair of guide blocks embracing opposite sides of a part of said slide, said guide block located in the direction of cam pressure being adjustable, for the purpose described.

22. In a machine of the character indicated, a slide, means for slidably guiding the same, and means for non-rotatably guiding the same, including a pair of blocks on said frame, a cam for feeding said slide, said cam serving to press a part of said slide against one of said blocks, said last mentioned block being adjustable, for the purpose described.

23. In a machine of the character indicated, a frame, a spindle carrier, a plurality of spindles rotatably mounted therein, a stem extending from said spindle carrier, a tool slide slidably mounted on said stem, a cam for feeding said tool slide on said stem, a downwardly projecting guide member on said tool slide, and a plurality of wear blocks engaging said guiding portion, said wear block at the side resisting cam pressure being adjustable.

24. In a machine of the character indicated, a frame, a rotatable work spindle, a cross tool slide movable transversely of said spindle, and a cross slide guide comprising a cantilever guide stud of circular section secured to said frame, the interfitting part of said cross slide being of circular section.

25. In a machine of the character indicated, a frame, a guide stud of circular cross section secured to said frame, and a cross slide having a cylindrical bore fitting said cylindrical stud, said cylindrical bore being closed at one end whereby when said slide is moved in a direction away from the end of said stud a partial vacuum will be created, for the purpose described.

26. In a machine of the character indicated, a frame, a cylindrical cross slide guide stud secured to said frame, a cross slide having a cylindrical bore fitting said cylindrical stud, the free end of said bore being closed, whereby upon movement of said slide onto said stud a substantial pressure will be created in said bore, for the purpose described.

27. In a machine of the character indicated, a frame, a cylindrical cross slide guiding stud rigidly secured to said frame, and a cross slide having a cylindrical bore fitting said stud for a substantial portion of its length, whereby tool pressure tending to flex said stud will confine such flexure to a relatively short arc and cause said slide to bind said stud more tightly.

28. In a machine of the character indicated, a frame, a pair of cross slides independent of each other, guide means of arcuate section for said slides and a common means engaging parts of said cross slides for preventing rotative movement thereof on said guide means.

29. In a machine of the character indicated, a frame, a plurality of cylindrical cantilever studs rigidly carried by said frame, a plurality of cross slides having cylindrical bores fitting said slides, and means for preventing rotation of said slides.

30. In a machine of the character indicated, a cantilever cross slide guide, a cross slide, interfitting parts of said guide and slide being curved in cross section, and means for taking up wear between said guide and slide.

31. In a machine of the character indicated, a frame having an upstanding wall, a cross slide guide, a cross slide at one side of said wall, slide feeding means at the opposite side of said wall, said wall having an aperture therein, and means extending through said aperture and connecting said slide and feeding means.

32. In a machine of the character indicated, a frame having an upstanding wall, a plurality of cross slides and guides at one side of said wall, slide actuating means at the opposite side of said wall, and means extending through said wall for connecting said slides and slide feeding means.

33. In a machine of the character indicated, a slide, an interfitting guide, said slide and guide constituting in effect a cylinder and piston whereby when said slide and guide are moved relatively to each other a pumping action will take place, and means for causing said pumping action to lubricate interfitting parts of said slide and guide.

34. In a machine of the character indicated, a slide, and a guide having parts forming in effect a piston and cylinder, whereby on relative sliding movements of said slide and guide a pumping action will take place, and means leading from said slide and guide to an oily atmosphere whereby a small quantity of oil will be fed to interfitting parts of said slide and guide.

35. In a machine of the character indicated, a frame, a cylindrical cantilever guide stud carried by said frame, and a cross slide having a cylindrical bore fitting said cantilever guide stud, the wall of said cylindrical bore being split and shimmed, whereby wear between said slide and guide may be taken up.

36. In a machine of the character indicated, a frame, upper and lower cross slides, and cam levers pivotally mounted in said frame for actuating said upper and lower slides, said levers being pivotally mounted concentrically on an axis intermediate said upper and lower slides, said levers having means engaging cams on a common cam shaft at opposite sides thereof.

37. In a machine of the character indicated, a cross slide, a cross slide guide secured to a frame, means for moving said cross slide, said means being positioned outside of said guide and between said guide and a tool carried by said slide.

38. In a machine of the character indicated, a spindle carrier, a plurality of rotatable spindles therein, upper and lower cross slides at one side of said spindle carrier, a main cam shaft, an auxiliary cam shaft driven from said main cam shaft, means for indexing said spindle carrier, including said auxiliary cam shaft, and means carried by said auxiliary cam shaft for actuating both of said cross slides.

39. In a machine of the character indicated, a frame, a spindle carrier indexibly mounted therein, a plurality of rotatable spindles carried by said spindle carrier, a main cam shaft, a gear thereon intermediate the front and rear ends of said spindle carrier, a pair of auxiliary cam shafts parallel to said main cam shaft, one at each side of said spindle carrier, and gears on said auxiliary cam shafts and meshing with said gear on said main cam shaft, one of said auxiliary cam shafts having indexing means for said spindle carrier and each of said auxiliary cam shafts having means for feeding a cross slide.

40. In a machine of the character indicated, a spindle carrier, a plurality of rotatable spindles mounted therein, anti-friction bearings for supporting said spindles, stock feed tubes in said spindles and supported thereby, said spindle carrier having a rear plate secured thereto and spaced rearwardly therefrom, said stock feed tubes being supported at the rear by said rear plate, and anti-friction bearings interposed between said plate and said stock feed tubes.

41. In a machine of the character indicated, an indexible turret, a plurality of rotatable spindles carried thereby, a rear plate carried by and spaced from said turret, stock feed tubes in each spindle, said stock feed tubes being journaled in said rear spaced-apart plate, a stock reel connected to said rear plate so as to be indexible with said turret, and stock tubes carried by said reel.

42. In a machine of the character indicated, a spindle carrier, a plurality of rotatable spindles carried thereby, chucks for said spindles, a chucking slide for actuating said chucks, and cam means for actuating said chucking slide, said cam means having spaced apart cam surfaces to permit manual actuation of said chucking slide acting upon a chuck in loading position.

43. In a machine of the character indicated, an indexible spindle carrier, a plurality of rotatable spindles carried thereby, chucking means for each spindle, a chucking slide to actuate the chuck of a spindle in loading position, a cam for closing said chucking slide before indexing of said spindle carrier, stock feeding means including a feed slide, and cam means for withdrawing said stock feed means during indexing movement of said spindle carrier.

44. In a machine of the character indicated, an indexible spindle carrier, a plurality of rotatable spindles therein, chucks for said spindles, a chucking slide for actuating the chuck of each spindle when in loading position, a guide track engaging a part of the chucking mechanism of each spindle to maintain each chuck closed in all positions except loading position, a short guide track on said chucking slide, to normally align the chucking slide with said first guide track, cam means for moving said slide to unchuck a chuck while each spindle is in loading position, a stock feed tube for each spindle, a guide track for maintaining said stock feed tubes in withdrawn position, a feed slide having a relatively long guide track thereon, and a cam for actuating said feed slide whereby said long guide track on said feed slide may withdraw one feed tube during each indexing movement and position the same so that the groove thereof will be engaged by said stock feed tube guide track.

45. In a machine of the character indicated, an indexible spindle carrier, a plurality of rotatable spindles carried thereby, a stock feed tube for each spindle, a stock feed slide, a shoe carried thereby and engageable with each stock feed tube when in loading position, said shoe being movably mounted, and manual means for moving said shoe out of engagement, for the purpose described.

46. In a machine of the character indicated, a stock feed tube, a feed slide, a feed shoe carried thereby, a return shoe carried thereby, said feed shoe being normally in engagement with said stock feed tube, means for manually retracting said feed shoe from engagement with said stock feed tube, latch means for automatically latching said feed shoe in retracted position, and automatic means for unlatching said feed shoe.

47. In a machine of the character indicated, a stock feed member, a feed slide, a feed shoe, a return shoe, one of said shoes being normally in constant engagement with said feed member, manual means for retracting said last mentioned shoe to free said stock feed member therefrom, means for latching said last mentioned shoe in retracted position, and automatic means for unlatching said shoe.

48. In a machine of the character indicated, a stock feed member, a feed slide, a feed shoe movably carried thereby, a return shoe carried thereby, said feed shoe being normally in engagement with said feed member, means for manually retracting said feed shoe from engagement with said feed member, latching means for latching said feed shoe in retracted position, said return shoe being engageable with said stock feed member for returning the same to its rearward position, and automatic means for unlatching said feed shoe at about the rearward limit of its movement to reengage said stock feed member which has been moved by said return shoe to a position to be reengaged by said feed shoe.

49. In a machine of the character indicated, a stock feed tube having a spool thereon, a feed slide, a feed shoe carried by said slide and normally in engagement with said spool, a return shoe carried by said slide and positioned forwardly of said spool, manual means for retracting said feed shoe to free said spool therefrom, whereby said feed tube may be moved independently of said feed shoe, said return shoe being positioned to engage said spool and return said feed shoe toward the rear, latching means for latching said feed shoe in retracted position, and automatic means for unlatching said feed shoe so as to cause the same to reengage said spool.

50. In a machine of the character indicated, a stock feed member, a feed shoe for actuating the latter, said feed shoe being spring pressed against stop means to normally engage said stock feed member, and manual means for retracting said feed shoe to disengage said stock feed member therefrom, for the purpose described.

51. In a machine of the character indicated, a stock stop, cam means for moving the same to stock stopping position, and manual means to move said stock stop to an out of the way position irrespective of the position of said cam means.

52. In a machine of the character indicated, a stock stop, a cam for moving the same, and connecting means between said cam and stop, said connecting means including a manually releasable connection for permitting said stock stop to be moved manually independently of said cam.

53. In a machine of the character indicated, a stock stop, a two-part shaft connected thereto, a cam for rocking said shaft for moving said stock stop, and means connecting said two-part shaft whereby the two parts may be moved as a unit under the influence of said cam, said connecting means being manually releasable to permit one part of said shaft and said stock stop to be moved by hand and independently of the other part of said shaft.

54. In a machine of the character indicated, a stock stop, cam means for moving the latter, manual means for moving the latter, and connecting means between said manual and cam means, said cam means being automatically engageable to move said stock stop after the latter has been manually moved.

55. In a machine of the character indicated, a stock stop, means for manually moving the same, and cam means automatically operable to actuate said stock stop after the same has been manually moved.

56. In a machine of the character indicated, a stock stop, a shaft connected thereto, a second shaft, and cam means for moving said second shaft, said two shafts being releasably connected to each other whereby said stock stop may be moved by said cam and whereby said stock stop may be manually moved independently of said cam.

57. In a machine of the character indicated, a stock stop, cam means for normally moving the same, and resilient connecting means between said cam and stock stop whereby the latter may be manually moved independently of said cam.

58. In a driving mechanism, a driving member, a driven member, clutch mechanism between said members, and a movable clutch actuator, said actuator having means for closing said clutch mechanism upon movement of said actuator in one direction and releasing said clutch mechanism upon further movement of said actuator in the same direction.

59. In a driving mechanism, a driving member, a driven member, a friction clutch between said members, one of said members having positive clutch means, a friction clutch actuator rotatable with the other of said members and having positive clutch means to coact with said first mentioned positive clutch means, said actuator having means for successively closing and then opening said friction clutch means upon movement of said actuator in one direction, said coacting positive clutch means being engageable upon further movement of said actuator in the same direction.

60. In a machine of the character indicated, a drive member for driving one part of a friction clutch and one part of a positive clutch, a drive spindle carrying means having complementary friction and positive clutch parts, the part of said means carrying said complementary positive clutch part having actuating means to engage said friction clutch parts and release the same upon a single movement.

61. In a machine of the character indicated, a work holder, a tool holder, a feed means normally operable in a continuous cycle, a clutch therefor, and means to be set by hand during a cycle and actuable by said feed means for throwing said clutch at a predetermined point in the cycle of said feed means.

62. In a machine of the character indicated, a spindle carrier, means for indexing the same, a stem carried by said spindle carrier, a tool slide slidably guiding on said stem, means for non-rotatably guiding said slide including a guide to cooperate with a part of said slide, a wear block between said guide and slide part, cam means for feeding said slide and acting in a direction to press said slide, guide and wear block together, and means for adjusting said wear block, for the purpose described.

63. In a machine of the character indicated, a spindle carrier, a plurality of rotatable spindles carried thereby, front and rear cross slides, a main drive shaft, front and rear auxiliary shafts, gears carried by said front and rear auxiliary shafts, a gear carried by said main drive shaft and meshing with said first mentioned gears, and cam means on the faces of said first mentioned gears for actuating said cross slides.

64. In a machine of the character indicated, a spindle carrier, front and rear cross slides, a main drive shaft, front and rear auxiliary shafts, gears carried by said front and rear auxiliary shafts, a gear carried by said main drive shaft and meshing with said first mentioned gears, and cam means on the faces of said first mentioned gears for actuating said cross slides.

65. In a machine of the character indicated, a spindle carrier, a plurality of rotatable spindles therein, upper and lower cross slides at one side of said spindle carrier, a main shaft, an auxiliary shaft, a gear carried by said auxiliary shaft, a gear carried by said drive shaft for driving said first mentioned gear, and cam means on opposite faces of said gear carried by said auxiliary shaft for actuating said upper and lower cross slides.

66. In a machine of the character indicated, a spindle carrier, a plurality of rotatable spindles carried thereby, a cross slide, a main shaft, an auxiliary shaft, meshing gears on said shafts and located longitudinally rearwardly of the face of said spindle carrier, and cam means on the face of one of said gears for actuating said cross slide.

67. In a machine of the character indicated, a spindle carrier, a plurality of rotatable spindles carried thereby, cross slides on opposite sides of said spindle carrier, a plurality of longitudinally extending shafts, gears connecting said shafts and located intermediate the longitudinal ends of said spindle carrier, and cam means carried by the face of a plurality of said gears for actuating said cross slides.

68. In a machine of the character indicated, an indexible spindle carrier, a plurality of rotatable spindles carried thereby, front and rear cross slides, a main cam shaft, an auxiliary cam shaft at the front of said machine, an auxiliary shaft at the rear of said machine, gears carried by said auxiliary shafts, a gear carried by said main shaft and meshing with said gears on said auxiliary shaft, said gears being located intermediate the longitudinal ends of said spindle carrier, cam means on the faces of said gears on said auxiliary shafts for actuating said cross slides, and indexing means for said spindle carrier actuated by one of said shafts.

69. In a machine of the character indicated, an indexible spindle carrier, a plurality of rotatable spindles carried thereby, a cross slide, a drive shaft, an auxiliary shaft, a gear carried by said auxiliary shaft and located adjacent said cross slide, a gear carried by said drive shaft and meshing with said first mentioned gear, and cam means on the face of said gear on said auxiliary shaft for actuating said cross slide.

70. In a machine of the character indicated, a frame having a wall, an indexible spindle carrier mounted on said frame and having the front face at one side of said wall, a plurality of rotatable spindles carried by said spindle carrier, a cross slide located at the front of said wall, a drive shaft, a gear thereon, an auxiliary shaft, a gear thereon meshing with and driven by the gear on said drive shaft, said gears being located at the rear side of said wall, cam means carried by the face of the gear on said auxiliary shaft, and means for actuating said cross slide from said cam means and including a part extending through said wall.

71. In a machine of the character indicated, a frame, an indexible spindle carrier mounted thereon, a plurality of rotatable spindles carried by said spindle carrier, means for rotating said spindles in said spindle carrier, a main cam shaft beneath and extending substantially parallel to the axis of said spindle carrier, a pair of auxiliary cam shafts parallel to said first cam shaft and located adjacent the front and back sides of said frame, said auxiliary cam shafts lying in a horizontal plane above the horizontal plane through said main cam shaft, forming tool supports, and means on said auxiliary shafts for actuating said forming tool supports.

72. In a machine of the character indicated, a frame, an indexible spindle carrier mounted thereon, a plurality of rotatable spindles carried by said spindle carrier, means for rotating said spindles in said spindle carrier, a stem projecting centrally from said spindle carrier, a main tool slide slidably mounted thereon, front and back cross slides, a main cam shaft beneath said spindle carrier and parallel to the axis of indexing thereof, front and back auxiliary cam shafts parallel to said first mentioned cam shaft and located respectively adjacent the front side and back side of said frame, means on said main cam shaft for actuating said main tool slide, a gear on said main cam shaft, gears on said auxiliary cam shafts and meshing with said gear on said main cam shaft, and cam means on the faces of said gears on said auxiliary shafts for actuating said cross slides.

73. In a machine of the character indicated, a frame, an indexible spindle carrier mounted thereon, a plurality of rotatable spindles carried by said spindle carrier, means for rotating said spindles in said spindle carrier, a bottom cross slide, a top cross slide, a separate actuating lever for each of said cross slides, said levers being mounted on a common fulcrum, and separate cams for rocking said two levers for actuating said top and bottom cross slides.

74. In a machine of the character indicated, a frame, an indexible spindle carrier mounted thereon, a plurality of rotatable spindles carried by said spindle carrier, means for rotating said spindles in said spindle carrier, a main cam shaft beneath said spindle carrier and parallel to the axis of indexing thereof, an auxiliary cam shaft parallel to said main cam shaft and located in a plane above said main cam shaft and adjacent one side of said frame, an end working tool slide, means for actuating the same from said main cam shaft, a cross slide, means for actuating said cross slide from said auxiliary cam shaft, and means for driving said cam shafts in synchronism.

75. In a machine of the character indicated, a frame, an indexible spindle carrier mounted thereon, a plurality of rotatable spindles carried by said spindle carrier, means for rotating said spindles in said spindle carrier, a main tool slide stem projecting axially from the front face of said spindle carrier, a main tool slide slidably mounted on said stem, said frame having a generally upstanding front wall, the face of said spindle carrier being exposed at the front side of said wall, a main cam shaft extending at both the front and rear sides of said generally upstanding wall and located beneath said spindle carrier, cam means on said main cam shaft and located below said main tool slide for actuating said main tool slide, a pair of auxiliary cam shafts extending rearwardly from said front wall, gear means in rear of said generally upstanding wall and connecting said auxiliary shafts and said main cam shaft, all of said cam shafts being parallel to the axis of indexing of said spindle carrier, front and rear cross slides, cam means on said gear means on said auxiliary shafts, and means connecting said cross slides and said last mentioned cam means whereby the latter actuate said cross slides.

76. In a machine of the character indicated, a frame, an indexible spindle carrier indexibly mounted thereon, a plurality of rotatable spindles carried by said spindle carrier, means for rotating said spindles, extension lugs on and extending rearwardly of said spindle carrier, a substantial plate at the ends of said lugs whereby said plate is rigid with and spaced from said spindle carrier, said spindles being rotatably mounted in said rear plate.

77. In a machine of the character indicated, a frame, an indexible spindle carrier indexibly mounted thereon, a plurality of rotatable spindles carried by said spindle carrier, means for rotating said spindles in said spindle carrier, a plate member in rear of said spindle carrier and spaced apart therefrom, connecting members extending from the rear of said spindle carrier to said plate and rigidly connecting said spindle carrier and plate and holding the same in spaced apart relation with the rear of said spindle carrier, and means including said plate for indexing said spindle carrier.

78. In a machine of the character indicated, a frame, an indexible spindle carrier mounted thereon, a plurality of rotatable spindles carried by said spindle carrier, means for rotating said spindles in said spindle carrier, clutches for said spindles, a plate spaced from the rear of said spindle carrier, means for rigidly connecting said plate and spindle carrier whereby they move as a unit, clutch actuating means for said spindles, said clutch actuating means being supported at least in part by said plate and located between said plate and the rear of said spindle carrier.

79. In a machine of the character indicated, a frame, an indexible spindle carrier mounted thereon, a plurality of rotatable spindles carried by said spindle carrier, means for rotating said spindles in said spindle carrier, a plate in rear of and spaced from said spindle carrier, means for rigidly connecting said plate and spindle carrier whereby they move as a unit, and means for supporting actuating parts for parts of said spindles at least in part by said plate.

80. In a machine of the character indicated, a frame, an indexible spindle carrier indexibly mounted thereon, a plurality of rotatable spindle units including chucking means and feed tube means, means for rotating said spindle units, a rear plate spaced from the rear of said spindle carrier, means for rigidly connecting said rear plate and spindle carrier and supporting the same in spaced apart relation, and means for supporting actuating means for parts of said spindle units at least in part from said rear plate.

81. In a machine of the character indicated, a frame, an indexible spindle carrier indexibly mounted thereon, a plurality of rotatable spindles carried by said spindle carrier, means for rotating said spindles in said spindle carrier, extension means on the rear of said spindle carrier, a plate supported by said extension means from said spindle carrier and in spaced apart relationship therewith, and means coacting with said plate for indexing the same and said spindle carrier.

82. In a machine of the character indicated, a frame, a spindle carrier indexibly mounted thereon, a plurality of rotatable spindles carried by said spindle carrier, means for rotating said spindles, a rear plate, means for rigidly connecting the same with said spindle carrier and supporting the same in spaced apart relation with said spindle carrier, a stock reel, means connecting said stock reel and plate whereby said stock reel will be indexed with and by said plate and spindle carrier, and feed tubes in said spindles and rotatably supported by said plate.

83. In a machine of the character indicated, a frame, a spindle carrier indexibly mounted thereon, a plurality of rotatable spindles carried by said spindle carrier, means for rotating said spindles, a rear member on said spindle carrier and comprising a plate and circumferentially spaced webs or lugs connecting said plate and spindle carrier whereby said parts are all rigid and move as a unit with each other.

84. In a multiple spindle machine, the combination of a bed, a pair of upright housings thereon, a tool supporting tie bar connecting the tops of said housings, top slides carried on opposite sides of said tie bar, an end working tool carried on one side of said tie bar, a main tool slide located below said tie bar, a work spindle carrier and its operating mechanism located in one of said housings, and means for operating said main tool slide and said end working tool carried by said tie bar including means located in the other of said housings.

85. In a multiple spindle machine, the combination of a bed, a pair of upright housings carried thereon, a tool supporting tie bar connecting the tops of said housings, top slides carried by and on one or both sides of said tie bar, end working tools carried on at least one lateral side of said tie bar, a main tool slide located below said tie bar, a work spindle carrier and its operating mechanism located in one of said housings, means for operating said main tool slide and said end working tool carried by said tie bar and including means located in the other of said housings, a pair of cross slides carried by an extension of the work spindle carrier housing and means located in said last mentioned housing for directly operating said slides.

86. In a multiple spindle machine, the combination of a bed with two upright housings thereon, a tie bar connecting the tops of the housings, a work carrier supported by one of said housings, gear means carried by the other of said housings, supporting means carried at at least one of the lateral sides of said tie bar, end working tool means carried by said supporting means, and means for operating said tool means.

87. In a multiple spindle machine, the combination of a bed with two upright housings thereon, a tie bar connecting the tops of the housings, a spindle carrier in one of said housings, gear means in the other of said housings, cross working tool means supported by said tie bar, supporting means depending from at least one of the lateral sides of said tie bar, end working tool means carried by said supporting means, and means for operating said tool means.

88. In a multiple spindle machine, the combination of a bed with a pair of upright housings, a tool supporting tie bar connecting the tops of said housings, auxiliary tool mechanism carried by said tie bar at at least one side face thereof, a slide supporting said auxiliary tool mechanism, means for operating said mechanism, and a top cross slide also carried by said tie bar and means for operating it.

89. In a multiple spindle machine, the combination of a bed having a pair of upright housings thereon, a tool supporting tie bar connecting the tops of said housings, auxiliary tool means carried by said tie bar and including a slide on at least one of the side faces of said tie bar, and upper and lower spaced apart slide guide means carried by said tie bar for supporting and guiding said slide.

90. In a multiple spindle machine, the combination of a bed, a pair of upright housings thereon, a tool supporting tie bar connecting the tops of said housings, a top cross slide supported by said tie bar, end working tool means supported on at least one side of said tie bar and operated from one of the housings, a main tool slide located below said tie bar, a work spindle carrier and its operating mechanism located within one of said housings, said carrier having an extension projecting into the other housing and supporting said main tool slide, one or more cross slides carried by an extension of the work spindle carrier housing and operated by means within said housing, and means for driving said mechanism.

91. In a multiple spindle machine, the combination of a bed, a pair of upright housings thereon, a tool supporting tie bar connecting the tops of said housings, a main tool slide located below said tie bar, a work spindle carrier and its operating mechanism located within one of said housings, said carrier having an extension to the other of said housings and supporting said main tool slide, one or more cross slides carried by said tie bar, and means within said spindle carrier housing for operating said one or more cross slides.

92. In a multiple spindle machine, the combination of a bed, a pair of upright housings thereon, a tie bar connecting the tops of said housings, a main tool slide located below said tie bar, means extending from one housing to the other for supporting said main tool slide, a cam drum for operating said main tool slide, a cam shaft on which said cam drum is mounted and located below said main tool slide, and a sleeve between said two housings for enclosing said cam shaft.

93. In a multiple spindle machine, the combination of a bed, a pair of upright housings thereon, a tool supporting tie bar connecting the tops of said housings, a main tool slide located below said tie bar, means extending from one housing to the other for supporting said slide, a work spindle carrier located in one of said housings, means also within said last housing for operating said work spindle carrier, a cam drum within an extension of the other housing, said extension and slide having coacting ways for guiding said slide.

94. In a multiple spindle machine, the combination of a bed, a pair of upright housings thereon, a tool supporting tie bar connecting the tops of said housings, a main tool slide located below said tie bar, means extending from one housing to the other for supporting said slide, a work spindle carrier located in one of said housings, means also within said last housing for operating said work spindle carrier, a cam drum within an extension of the other housing, and means on said main tool slide extending downwardly through said extension and coacting with said cam drum for feeding said tool slide.

95. In a multiple spindle machine, the combination of a bed, a pair of upright housings thereon, a tool supporting tie bar connecting the tops of said housings and adapted to carry end working tools and a stock stop, a main tool slide located below said tie bar, means extending from one housing to the other for supporting said slide, a stock stop carried by said tie bar, and means for operating said tool slide and said stock stop.

96. In a multiple spindle machine, the combination of a bed, a pair of upright housings thereon, a tool supporting tie bar connecting the tops of said housings, a main tool slide located below said tie bar, means extending from one housing to the other for supporting said slide, an auxiliary tool slide having a part slidable along one side face of said tie bar, and means extending over said part to slidably hold said auxiliary slide on said tie bar, and means for actuating said main and auxiliary tool slides.

GEORGE O. GRIDLEY.
DONALD H. MONTGOMERY.
EARL H. WHEELER.